(12) United States Patent
Adams

(10) Patent No.: US 11,030,357 B2
(45) Date of Patent: Jun. 8, 2021

(54) METHODS, DEVICES, AND SYSTEMS FOR DESIGNING AND CUSTOMIZING A VIRTUAL DECOR

(71) Applicant: Wesley T. Adams, Los Angeles, CA (US)

(72) Inventor: Wesley T. Adams, Los Angeles, CA (US)

( * ) Notice: Subject to any disclaimer, the term of this patent is extended or adjusted under 35 U.S.C. 154(b) by 0 days.

(21) Appl. No.: 16/681,064

(22) Filed: Nov. 12, 2019

(65) Prior Publication Data

US 2020/0082030 A1 Mar. 12, 2020

Related U.S. Application Data

(63) Continuation of application No. 15/782,483, filed on Oct. 12, 2017, now Pat. No. 10,496,765.

(60) Provisional application No. 62/445,695, filed on Jan. 12, 2017.

(51) Int. Cl.
| | | |
|---|---|---|
| *G06F 30/20* | (2020.01) | |
| *G06F 30/13* | (2020.01) | |
| *G06T 15/04* | (2011.01) | |
| *G06T 15/50* | (2011.01) | |
| *G06F 113/24* | (2020.01) | |

(52) U.S. Cl.
CPC .............. *G06F 30/13* (2020.01); *G06F 30/20* (2020.01); *G06T 15/04* (2013.01); *G06T 15/503* (2013.01); *G06F 2113/24* (2020.01); *G06T 2210/04* (2013.01); *G06T 2210/64* (2013.01)

(58) Field of Classification Search
CPC combination set(s) only.
See application file for complete search history.

(56) References Cited

U.S. PATENT DOCUMENTS

| | | | | |
|---|---|---|---|---|
| 2001/0017089 A1* | 8/2001 | Fujii | .................... | G06T 11/001 |
| | | | | 101/484 |
| 2004/0162766 A1* | 8/2004 | Fujii | ....................... | B41F 17/00 |
| | | | | 101/484 |
| 2007/0236671 A1* | 10/2007 | Bitetto | ................. | G03B 21/006 |
| | | | | 353/122 |
| 2015/0026016 A1* | 1/2015 | DeVeaux | ........... | G06Q 30/0643 |
| | | | | 705/27.2 |

* cited by examiner

*Primary Examiner* — Wesner Sajous
(74) *Attorney, Agent, or Firm* — James A. Italia; Italia IP

(57) ABSTRACT

Methods, devices, and systems for providing a virtual construction and design of an interior wall of a home or office are described. The virtual construction and design provides for various substrate layers as they would exist within the interior wall, interactions between substrate layers, as well as environmental effects. The virtual construction can be implemented on a website so that a user of the website is able to create, select, and purchase customized wallpaper patterns with various color effects, three-dimensional effects, aging effects, texture effects, and environmental effects.

15 Claims, 51 Drawing Sheets
(46 of 51 Drawing Sheet(s) Filed in Color)

Image Construction Detailed

1. Brick — Structural damage
2. Concrete — Crumbling
3. Plaster — Crumbling
5. Paint — Peeling
6. Adhesive — Drying
7. Wallpaper Base — Ripping
8. Wallpaper Surface — Scuffing
11. Color Ink — Fading
   - Cyan fading rate
   - Magenta fading rate
   - Yellow fading rate
   - Black fading rate
12. Reflectivity — Erosion
13. 3D Bevel — Compression
14. Environmental effects/dirt — Tarnish; scuff; sun; heat; crack; break.

FIG. 12

Image Construction Simplified

1. Brick
2. Plaster
3. Paint
4. Wallpaper Material
11. Ink
14. Environmental effects/dirt Structural damage
Crumbling
Peeling
Ripping
Fading
Tarnish; scuff; sun; heat; crack; break.

METHODS, DEVICES, AND SYSTEMS FOR DESIGNING AND CUSTOMIZING A VIRTUAL DECOR

CROSS-REFERENCE TO RELATED APPLICATIONS

This application is a Continuation Application of U.S. Non-Provisional application Ser. No. 15/782,483 filed Oct. 12, 2017 which claimed priority to and the benefit of the filing date of U.S. Provisional Application No. 62/445,695 filed Jan. 12, 2017, the disclosure of which are both hereby incorporated by this reference herein in their entirety.

BACKGROUND OF THE INVENTION

Field of the Invention

The present invention relates to the field of virtual or digital design and how it relates to manufacturing of physical products. More particularly, embodiments of the present invention relate to methods, devices, and systems for providing a virtual construction and design of a surface; such as decorative or architectural; culminating in the generation of a turnkey file and process finally resulting in a physical product such as wallcovering, upholstery, fabric, tile, canvas. In addition, the present invention relates to the field of virtual or digital design. More particularly, embodiments of the present invention relate to methods, devices, and systems for providing a virtual construction and design of an interior wall of a home or office and its overlying décor such as wallpaper or other decorations. The virtual construction and design provides for various substrate layers as they would exist within the interior wall, interactions between substrate layers, as well as environmental effects. The virtual construction can be implemented on a website so that a user of the website is able to create, select, and purchase customized wallpaper patterns with various color effects, three-dimensional effects, aging effects, texture effects, and the like.

Description of Related Art

Purchasing of wallpaper has traditionally involved going to a store and choosing from various samples of patterns presented to a user, such as in a wallpaper sample book. This provided a very limited selection to the home improvement enthusiast. With the advent of the internet, stores such as The Home Depot have offered a selection of wallpaper patterns through their websites. While selections have improved somewhat since the days when only brick and mortar stores were available, commercial websites have still only provided a limited number of options for patterns and colors with no options for customization of wallpaper patterns, colors, textures, and other effects according to a shopper's preferences. Even further, commercial websites have not offered any options for visualizing the wallpaper as it would appear on various substrates within the home or aging and environmental effects. As such, there is a need in the art for improvements that address these shortcomings.

SUMMARY OF THE INVENTION

To this end, embodiments of the invention provide a computer-implemented method for virtual design, such as virtual design of a construction with various substrate layers including wallpaper or other décor.

In one embodiment, the method includes the steps of providing two or more virtual substrates, where each virtual substrate is represented by an image and has one or more elements which define the appearance of the image, providing one or more interactive effects between elements of two or more of the virtual substrates, and providing one or more environmental and/or aging variables capable of influencing the appearance of the image.

In another embodiment, the method includes the steps of providing two or more cross-layers, and providing one or more interactions between cross-layers and/or providing one or more environmental and/or aging variables which affect one or more of the cross-layers. Each cross-layer represents a substrate in a virtual construction and one of the cross-layers represents wallpaper which includes a pattern.

In another embodiment, the method includes the steps of providing a database of image files representing wallpaper patterns having one or more features and a background, hosting the database on a server, and permitting a connection with the server from one or more client computers. The method further includes the step of displaying on a display of a connected client computer a plurality of wallpaper patterns from the database as well as a graphical user interface. The graphical user interface has features which allow one or more commands initiated at the connected client computer, which commands are operable to select one of the displayed wallpaper patterns and customize its appearance. The appearance of the wallpaper can be customized by selecting and changing colors of individual features and the background of the selected wallpaper pattern, adjusting the size of the features of the selected wallpaper pattern, adjusting the shade of a selected color, introducing aging and/or environmental effects within the selected wallpaper pattern, introducing three-dimensional effects within the selected wallpaper pattern, and/or introducing texture effects within the selected wallpaper pattern. Further, the method can include the step of initiating one or more of the commands at the client computer to select one of the displayed wallpaper patterns and customize its appearance.

Embodiments of the invention also include devices and systems for implementing the methods. These embodiments as well as additional embodiments and their aspects and features will be apparent in the foregoing Detailed Description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings illustrate certain aspects of embodiments of the present invention, and should not be used to limit the invention. Together with the written description the drawings serve to explain certain principles of the invention.

FIG. 12 is a table showing a detailed image construction according to an embodiment of the invention.

FIG. 13 is a table showing a simplified image construction according to an embodiment of the invention.

FIGS. 24-51 are screenshots showing implementation of the invention on a commercial website according to an embodiment of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Digital Décor

Embodiments of the invention provide methods, devices, and systems for providing, designing, and customizing a digital or virtual construction and décor. The methods, devices, and systems allow a user to virtually design decorations such as wallpaper, art, pictures, and the like as they would appear in the home or office. In one embodiment, the methods and devices provide for multiple substrate layers that mimic the layering of a physical object such as a wall and its overlying décor. Further, the methods, devices, and systems allow for the implementation of various attributes and features within each substrate as well as interaction between the substrates and various effects of environment and time on the digital décor. The methods, systems, and devices allow for a home improvement enthusiast to design, customize, and purchase customized wallpaper by introducing color effects, interactions with other substrates, environmental effects, aging effects, 3D effects, texture effects, and the like according to their preference.

Figure 1:
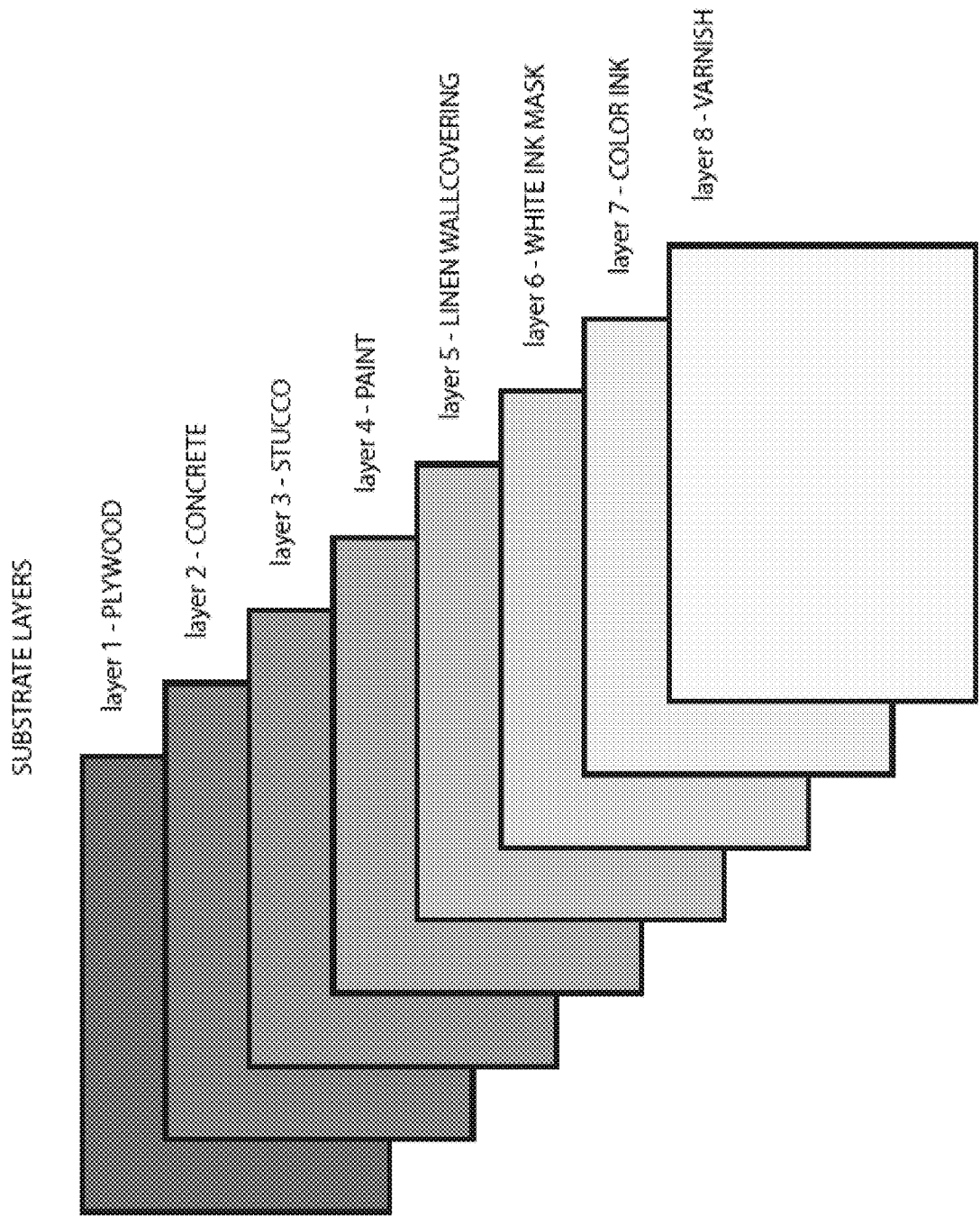
FIG. 1 is a diagram showing various virtual substrate layers according to an embodiment of the invention.

Turning now to the figures, FIG. 1 shows an embodiment of various substrate layers implemented in the invention to provide a virtual construction and décor. According to FIG. 1, eight substrate layers are ordered according to various layers within the construction of a wall and its overlying décor. The layers are arranged (from within the wall to the outside the wall as it appears within the home, office, etc.) such that the first layer is plywood, the second layer is concrete, the third layer is stucco, the fourth layer is paint, the fifth layer is a linen wallcovering, the sixth layer is a white ink mask, the seventh layer is color ink, and the eighth layer is varnish. However, these layers are merely examples of the types of layers that can be included. Further additional substrate layers that may be used in a construction may be used alternatively to or in addition to these layers, including vinyl, adobe, aluminum, steel, copper, other metals, cement, brick, drywall, plaster, gypsum board, paint, wood finish, paint finish, varnish, veneer, marble, ceramic, stone, plastics, foam, fabric, glass, fiberglass (such as in insulation), and various composites. Further, the décor in the virtual construction such as wallpaper may also include, alternatively or in addition, posters, paintings and other artwork, which can be composed of materials such as paint, paper, cardboard, fabric, wood, mirror, metal, stone, sand, and the like. As will be seen in the foregoing description, the virtual construction layers are implemented in various raster and vector image files which, by way of computer-readable code, may interact with one another to simulate the interaction of such materials in the real world.

Embodiments of the virtual construction may also relate to other components within a home, office, or other construction, such as a floor (e.g. carpet, padding, hardwood floor, etc.) or ceiling (lights, panels, insulation, roofing materials, etc.). Further, embodiments of the virtual construction may include, as an option, various infrastructure such as electrical wiring, plumbing, AC and heating vents, electrical switches and outlets, and so on. Further, the virtual construction is not limited to the number of layers depicted in FIG. 1 and may include as a few as two layers and as many as 20 layers, including 3, 4, 5, 6, 7, 8, 9, 10, 11, 12, 13, 14, 15, 16, 17, 18, or 19 layers, or within any range including or encompassing these values.

Figure 2:
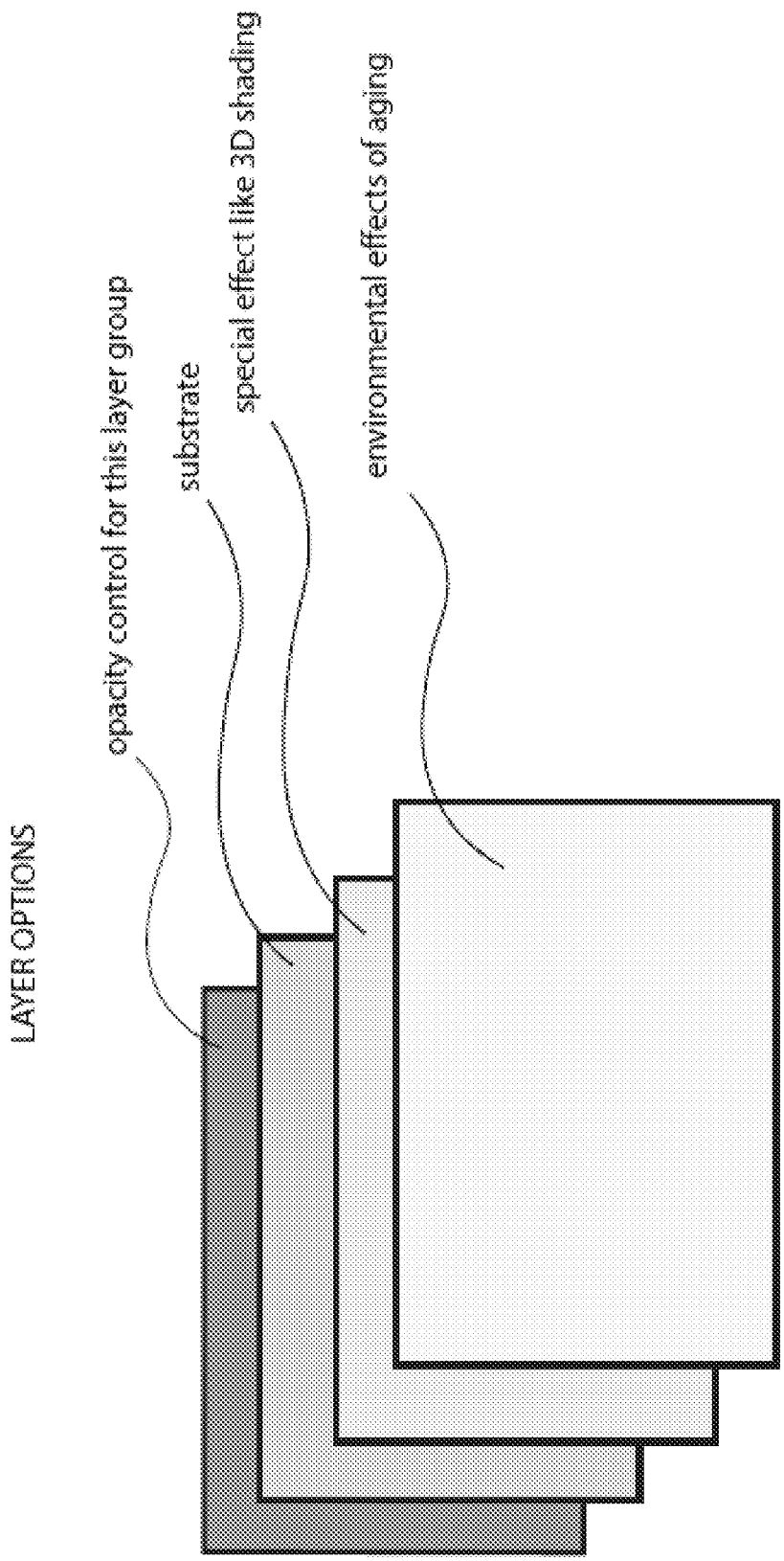
FIG. 2 is a diagram showing various sublayers which provide options for various effects within each virtual substrate layer according to an embodiment of the invention.

In embodiments, each layer has one or more sublayers which provide options for various effects within the layer. Shown in FIG. 2, these include opacity control, the type of substrate, special effects such as three-dimensional effects or shading, and environmental effects of aging. In addition, the sublayers of each layer may be configured such that certain features of two or more layers interact with each other. As such, the real life interaction between substrate materials can be simulated in the virtual substrate construction. For example, a paint layer can be configured so that it opaquely covers a stucco or drywall layer surface yet will not hide physical texture, bumps, and scratches on the surface of the drywall or stucco. In this way, opacity and three-dimensional effects are independent variables that can be programmed into the interaction between substrates. Thus, the paint layer is programmed to have 100% opacity, but also has a susceptibility to three-dimensional effects of underlying layers programmed in. A dent or hole in the stucco may accurately translate to a disruption in the paint layer by programming the susceptibility to such three-dimensional effects (which can be, for example, a number between 0% and 100%). Further, a layer of wallpaper can be configured with an option for a rip in the wallpaper which reveals and casts a shadow in the textured paint below.

Further, some layers can be configured or programmed to be susceptible to environmental effects of aging, but not others. For example, sun damage can be programmed to fade the ink and distort the wallpaper, but not affect the concrete. Half-life and environmental effects may be pre-programmed so that a desired effect may be achieved by entering variable numbers which translate to realistic effects as well as interactions between substrate layers. For example, the effects of five years of water damage can be simulated by programming relevant factors such as warping of the plywood layer, cracking of concrete, water damage to stucco, the effect of water-damaged stucco on paint, peeling and disintegration of paper, appearance of mold, etc. In this way, the aging variables for each layer may be adjusted so that they are influenced by a particular cause, time as well as an amount of interaction with the other layers. Environmental or aging variables that may be in introduced may include the effects of substances such as water, sunlight (e.g. UV light), florescent lighting, oxygen, dirt, and smoke. Additionally, the effects of "wear and tear" from interaction with humans, pets, etc. can also be introduced. The environmental or aging variables may be configured or programmed to introduce these effects months or years into the future, including 1 month, 2 months, 3 months, 4 month, 5 months, 6 months, 7 months, 8 months, 9 months, 10 months, 11 months, 1 year, 1.5 years, 2 years, 2.5 years, 3 years, 3.5 years, 4 years, 4.5 years, 5 years, 10 years, 15 years, 20 years, 25 years, 30 years, 40 years, 50 years, 75 years, 100 years, or within any range including or encompassing these values. These environmental and aging effects can be programmed using computer-readable code and can be made selectable according to preference.

Figure 3:
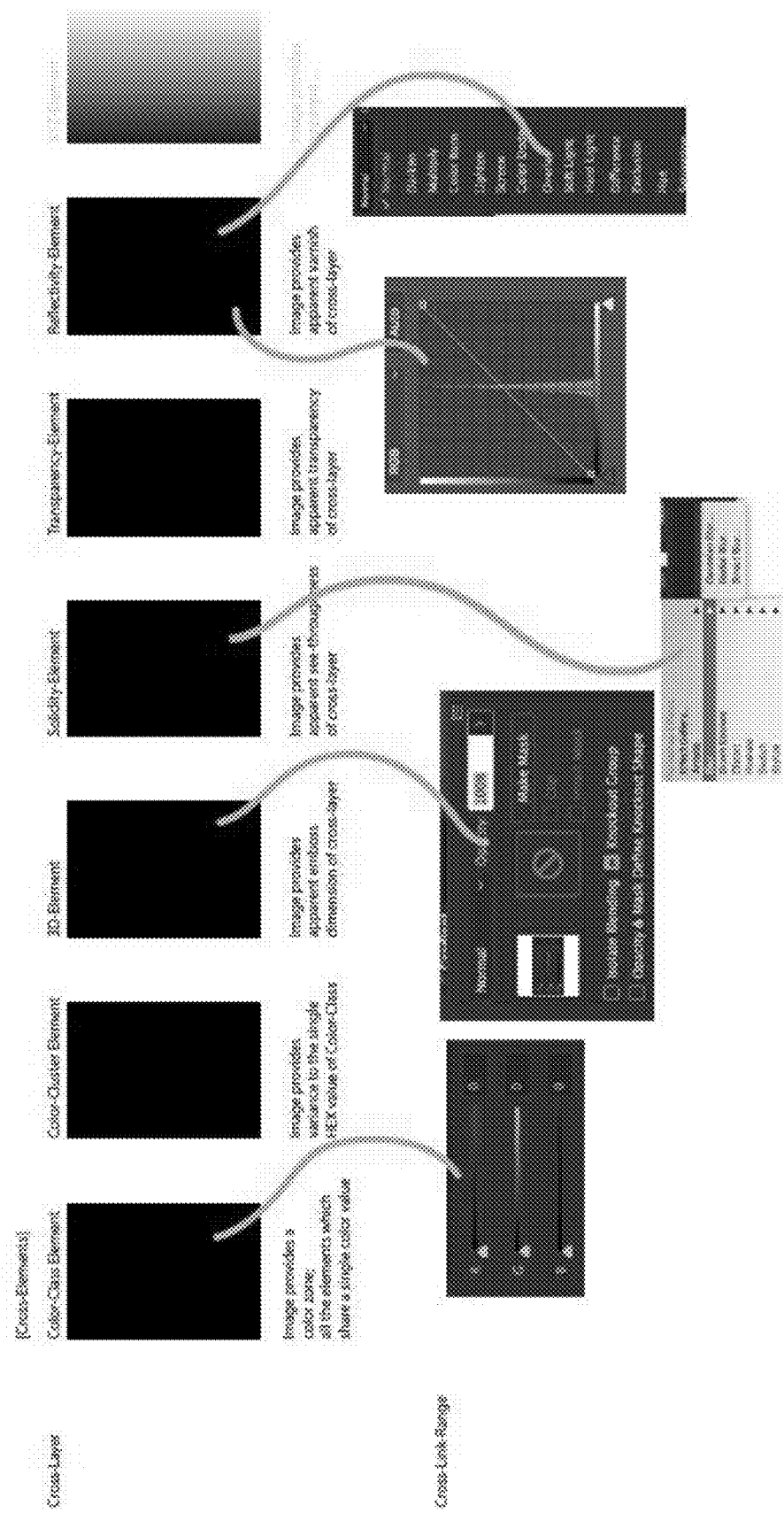
FIG. 3 is a diagram showing a "cross-construct" and its various features according to an embodiment of the invention.

FIG. 3 shows an implementation of a virtual construction and décor according to an embodiment of the invention. In particular, the implementation in FIG. 3 shows the concept of a "cross-construct" and its various features and how the cross-construct is instrumental in rendering a realistic two-dimensional image of wallpaper on a computer screen. The features of the cross-construct lend themselves to be dimensional even when presented on a two-dimensional computer screen. For example, in the case of wallpaper, a poster or other artwork on a wall, the cross-construct may describe a wall and its various substrate layers, the paper, its sheen, and its ability to inherit or mask the texture that is behind it.

In this embodiment, each substrate layer of the cross-construct is referred to as a "cross-layer" as shown in FIG. 3. The cross-layers represent everything that is visible on the wallpaper or other artwork and all of the elements behind it. In particular, the cross-layer can be or include one or more ink layers, the texture of the material, the construction of the material, which may include properties such as its longevity, its UV resistance, water resistance, which allow for programming of environmental effects on the material, so that at a given point in the future the change in appearance due to the environmental effects can be simulated, as well as the wall and all of the elements behinds it such as concrete, stucco, drywall, etc. The cross-layer allows for a user to select or change these features according to their preference.

In embodiments, a cross-layer is defined by its image, its effect on other cross-layers, and the effect of other cross-layers onto it. For example, if a cross-layer material is very thin, like a layer of thin vinyl, it will inherit the texture of the wall that it covers. Thus, in defining the wall cross-layer, one of the properties that can be programmed into the wall cross-layer is texture. The texture property can be defined through real physical 3D capture or simulated by way of its appearance in a photograph. The texture can be applied through "Mix Blend" features such as those in Adobe Illustrator or various other features that are programmed into a set of computer-executable instructions. As a result, the ink and paper cross-layers appear to share the texture property of the underlying wall cross-layer. If the cross-layer is composed of thicker material such as poster paper, the underlying texture will not have an effect on the paper cross-layer or overlying ink cross-layer(s). However, if there is a break or crack in the wall, the paper may be too thin to cover it and the break or crack will show through the paper. In this way, the thickness of the cross-layer materials defines its interaction with the cross-layer materials behind and in front of it. Said another way, a "cross-layer" is defined as a layer or strata in a virtual construction which includes an image plus various factors or elements which define the image.

FIG. 3 shows the construction of an individual cross-layer. As indicated previously, an individual cross-layer is defined by its image. The image has a color and the color can be changed or affected using elements (termed "cross-elements") built into the cross-layer construction. The cross-layer can be changed according to various parameters shown in the "cross-link range" row, including modification of the primary colors red, green, and blue in the "color-class" element. The color-class element provides a color zone such that all of the elements share a single color value. The "color-cluster element" allows for modification of a group of colors (such as they appear in a pattern) based on one command by the user and provides variance to the single HEX value of the color class element. Also shown is a "3D element" of the same cross-layer which may be an emboss, for example. The 3D cross-element is capable of storing and showing the information for the texture of the cross-layer. The 3D cross-element can be used to generate a virtual 3D effect or an actual 3D effect on a material such as an emboss on a piece of wood. The "solidity" element of the cross-layer defines how it would appear if it is backlit. If an element is solid, no light will penetrate and if the element is clear, even if there is color, light will penetrate and the cross-layer will show such penetration. The "transparency" element of the cross-layer is different than the solidity and it relates to how much it will colorize the cross-layer behind it. The "reflectivity" element of the cross-layer relates to how it appears from an indirect view such as from the side if a reflection in the material appears (e.g. is it shiny or matte). The "metallicity" of the cross-layer relates to whether the cross-layer (or a portion of the cross-layer) is metallic. This is an important feature since metallic layers such as a gold foil are not printable. All of these cross-elements are programmable and quantitatively and/or qualitatively adjustable according to the cross-link range row at the bottom of FIG. 3.

Figure 4:
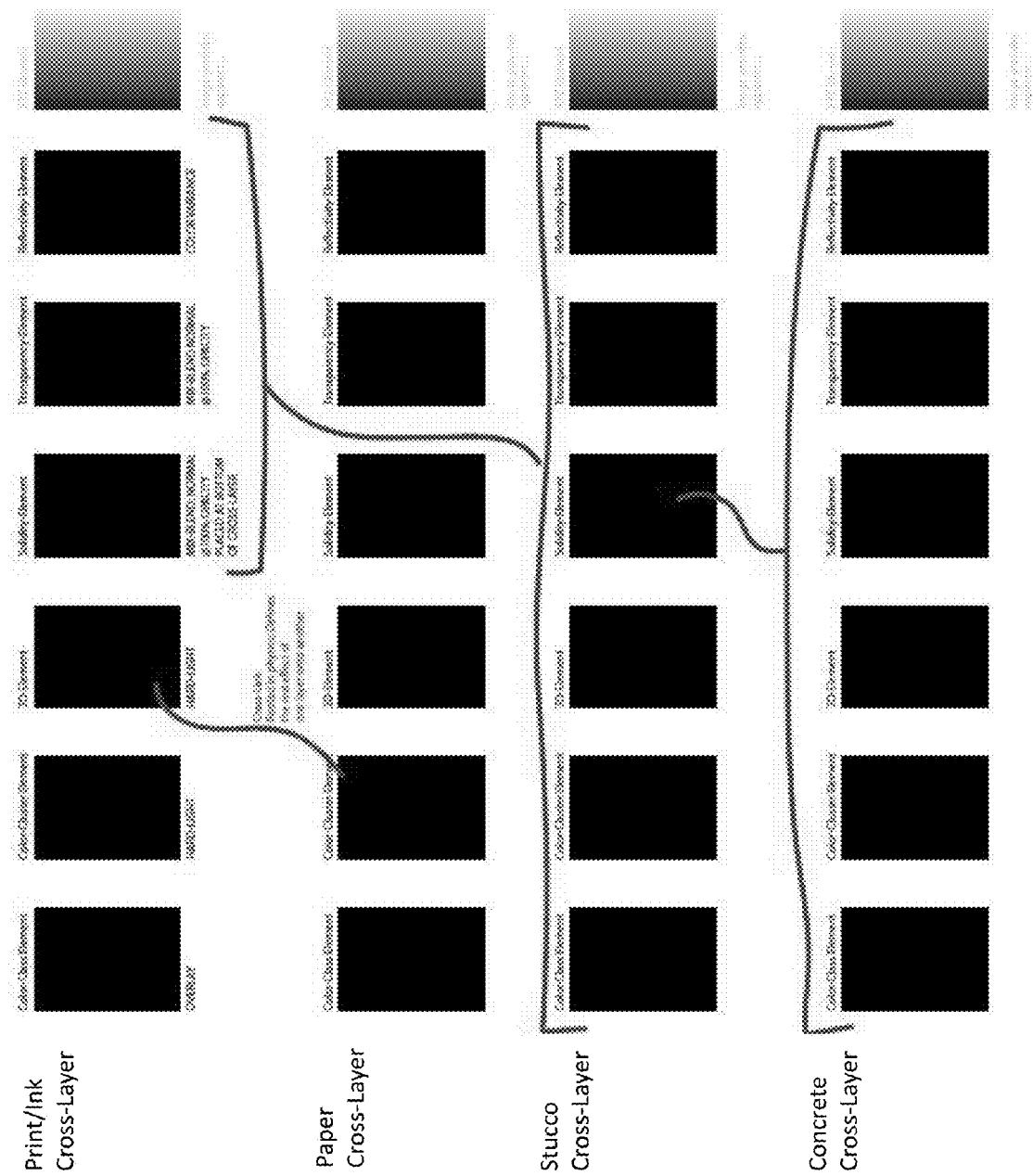
FIG. 4 is a diagram showing various cross-layers and cross-elements and their interaction according to an embodiment of the invention.

Turning now to FIG. 4, multiple cross-layers (from top to bottom, print, paper, concrete, and stucco cross-layers) and how they interact with each other are shown. The link that is made from one cross-layer to another is part of the "cross-construct". For example, in the case of the print cross-layer, the ink is heavily influenced by the paper cross-layer. For example, if the paper is recycled paper with lint in it and the paper is printed with a transparent ink, such lint will be visible. Thus, the relationship with the texture of the paper and the ink will be literally 1 to 1 in terms of the overall appearance of the construction. So then if one considers the transparency, solidity, and reflectivity of the paper and the effect of the underlying stucco cross-layer onto the paper, the virtual construction will describe how the stucco is cracked and the paper will inherit the shape of the crack in the stucco. To accomplish this a link is created between the ink cross-later and the paper cross-layer and the stucco cross-layer. This example that shows that not only does each individual layer exist individually in the virtual construction, there is a relationship between the stucco and the paper. This relationship is defined by taking the masks and information that are extracted from each cross-layer, creating a defined relationship between cross-layers. With respect to environmental or aging effects, a user may apply, for example, 50 years of aging, and the paper may be degraded in the simulated appearance shown in the cross-layer. The user may also apply the presence of water which will greatly affect and warp the paper, while the stucco may bubble up and affect the paper, yet the concrete may not be affected in this simulated appearance. However, a user may also be able to remove the water damage.

Thus, each cross-layer has a cross-link to another layer. As used herein, a "cross-link" is link between cross-layers that defines how they interact. For example, as FIG. 4 shows, various cross-layers have links to other cross-layers. The cross-layers are linked by the cross-elements between layers such that one cross-element of one layer influences one or more cross-elements of another layer. Such linkage (in terms of a number of cross-elements linked to other cross-elements) may be 1 to 1, 2 to 1, 3 to 1, 5 to 1, 6 to 1, 3 to 2, 5 to 2, 1 to 2, 1 to 3, 1 to 5, 2 to 3, 2 to 5, 1 to 6, and so on. Various examples of linkages between cross elements are shown in FIG. 4. For example, the 3D element of the print layer may be directly linked to the color cluster element of the layer below it. Further, the solidity, transparency, and reflectivity elements in the ink cross-layer may be linked to multiple elements in the stucco cross-layer. However, these are merely examples and embodiments provide for any conceivable arrangement of cross-links among the cross-element.

Figure 5:
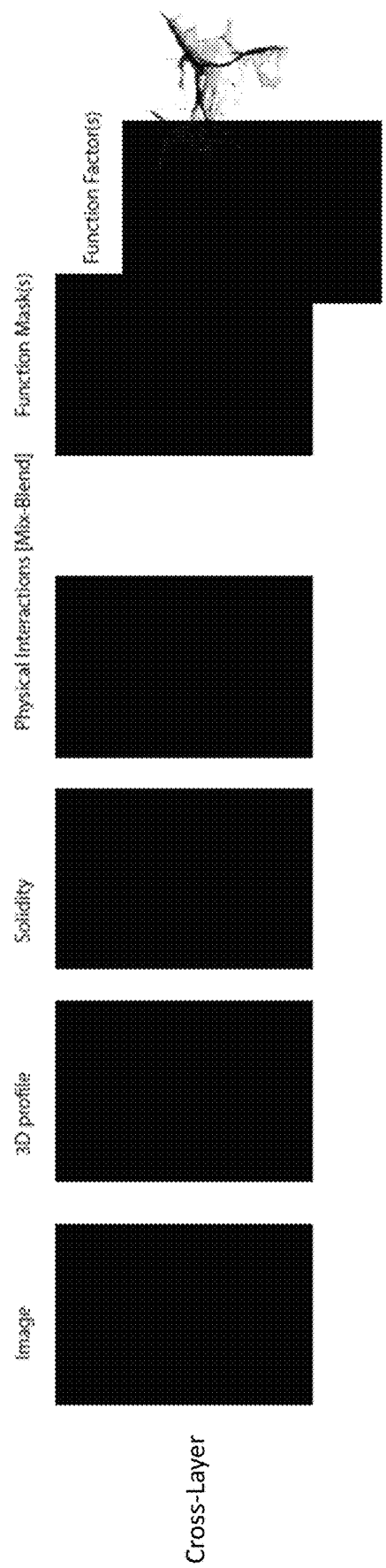
FIG. 5 is a diagram showing a composition of a cross-layer according to an embodiment of the invention.

According to embodiments, the appearance of a cross-layer can first be defined by providing a picture or image of the cross-layer. The picture may be a three-dimensional (3D) picture or a simulation. For example, a true 3D picture may be created by providing a picture of the 3D mask lined up precisely with the picture. If not a true 3D picture, a synthetic or simulated 3D picture can be made using DD3D. Solidity of the layer may be created by providing a picture of the solidity mask lined up precisely with the image. Additional considerations that may be programmed into the appearance of a cross-layer include the physical interaction of the image with other layers, whether the image is translucent, whether the image 3D transmits to adjacent cross-layer(s), whether the image color affects other cross-layers, etc. FIG. 5 shows this schematically, where the cross-layer is defined by an image, 3D profile, solidity, physical interactions (e.g. mix-blend effects), as well as function mask(s) and function factors(s). Thus, a cross-layer represents strata in a construction that includes an image, factors which define 3D, factors which define solidity, the effects of other cross-layers, and the effect onto other cross-layers.

In embodiments, interactions between cross-layers and the one or more environmental or aging variables are capable of adjustment according to a quantitative scale. The quantitative scale may be from 0% to 100%, 1 to 10, 1 to 5, or any variation of a quantitative scale. In other embodiments, the interactions between cross-layers and the one or more environmental or aging variables are qualitatively adjustable. For example, they may represent a shape or series of shapes, lines, or patterns that reflect texture, aging, or damage which may be changed according to preference by a designer. Thus, in some embodiments, the interactions between cross-layers and the one or more environmental or aging variables are capable of providing a secondary pattern overlaying a wallpaper pattern, which secondary pattern reflects texture, aging, or damage.

In another embodiment, a cross-layer can be defined as comprising a cross-material, a cross-mask, and a cross-factor. The cross-material is a distinct controllable image construction layer. The cross-mask defines areas of interaction between cross-layers, while a cross-factor defines how to control a cross-mask. Further, a cross-link is the link between cross-layers that defines how they interact. A cross-segment is a VLFF (Very Large File Format) segment and a cross-3D segment is a VLFF segment with retained cross-layer 3D topographic data for each cross-layer (i.e. for 3D printing).

Figure 6:
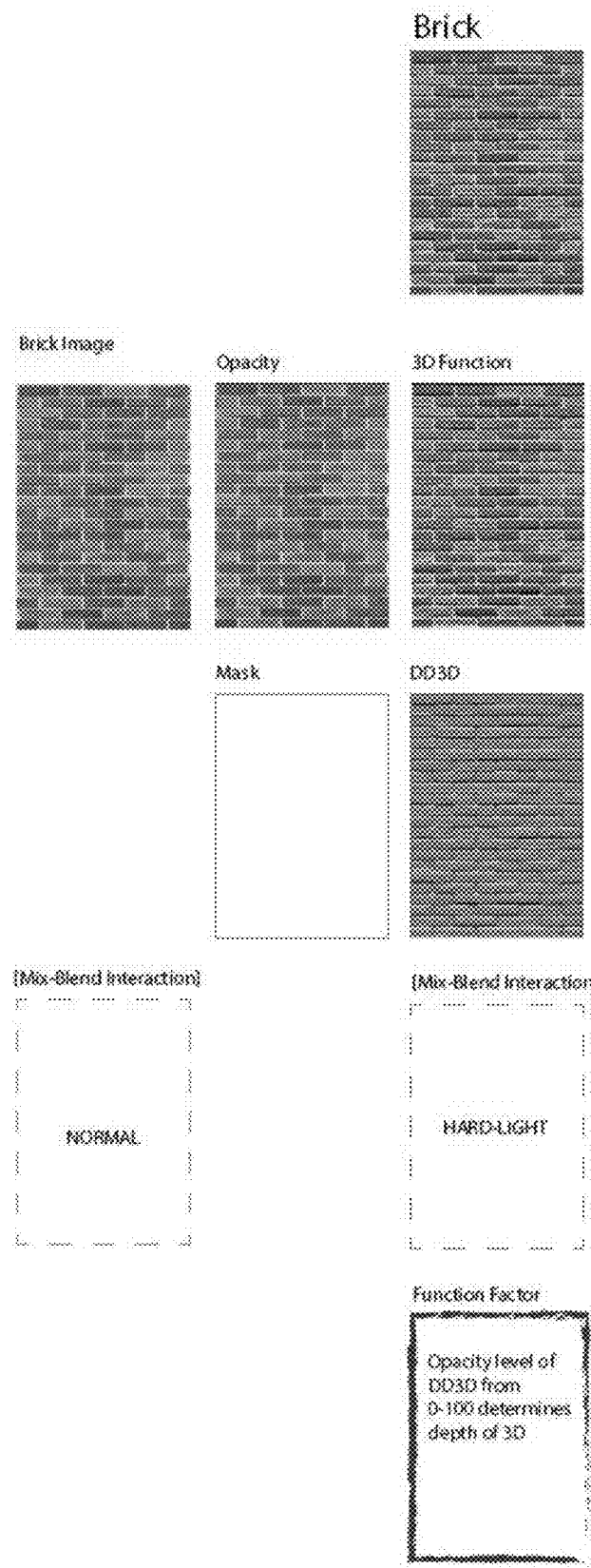
FIG. 6 is a diagram showing a brick cross-layer and its various components according to an embodiment of the invention.
Figure 7:
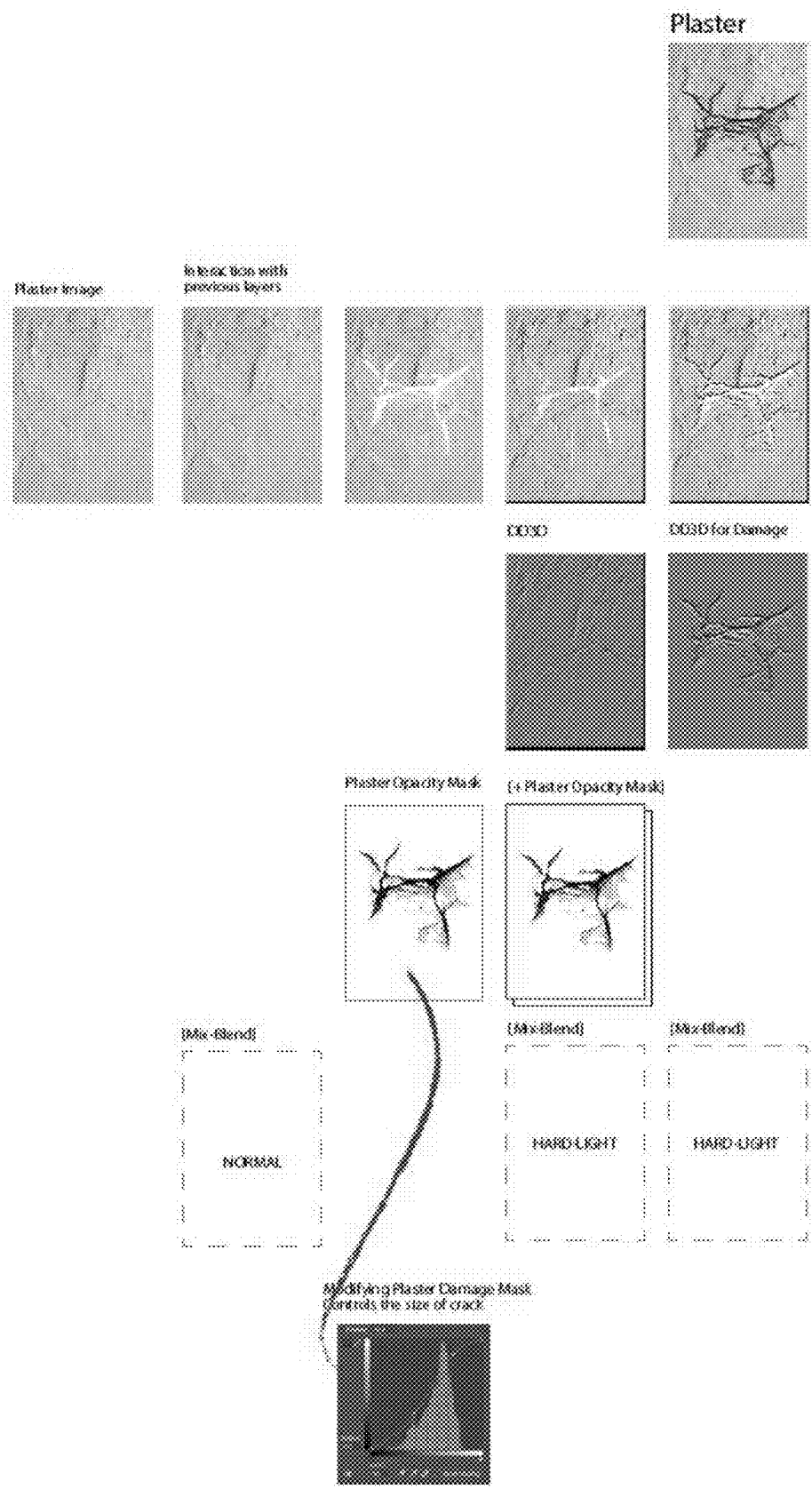
FIG. 7 is a diagram showing a plaster cross-layer and its various components according to an embodiment of the invention.
Figure 9:
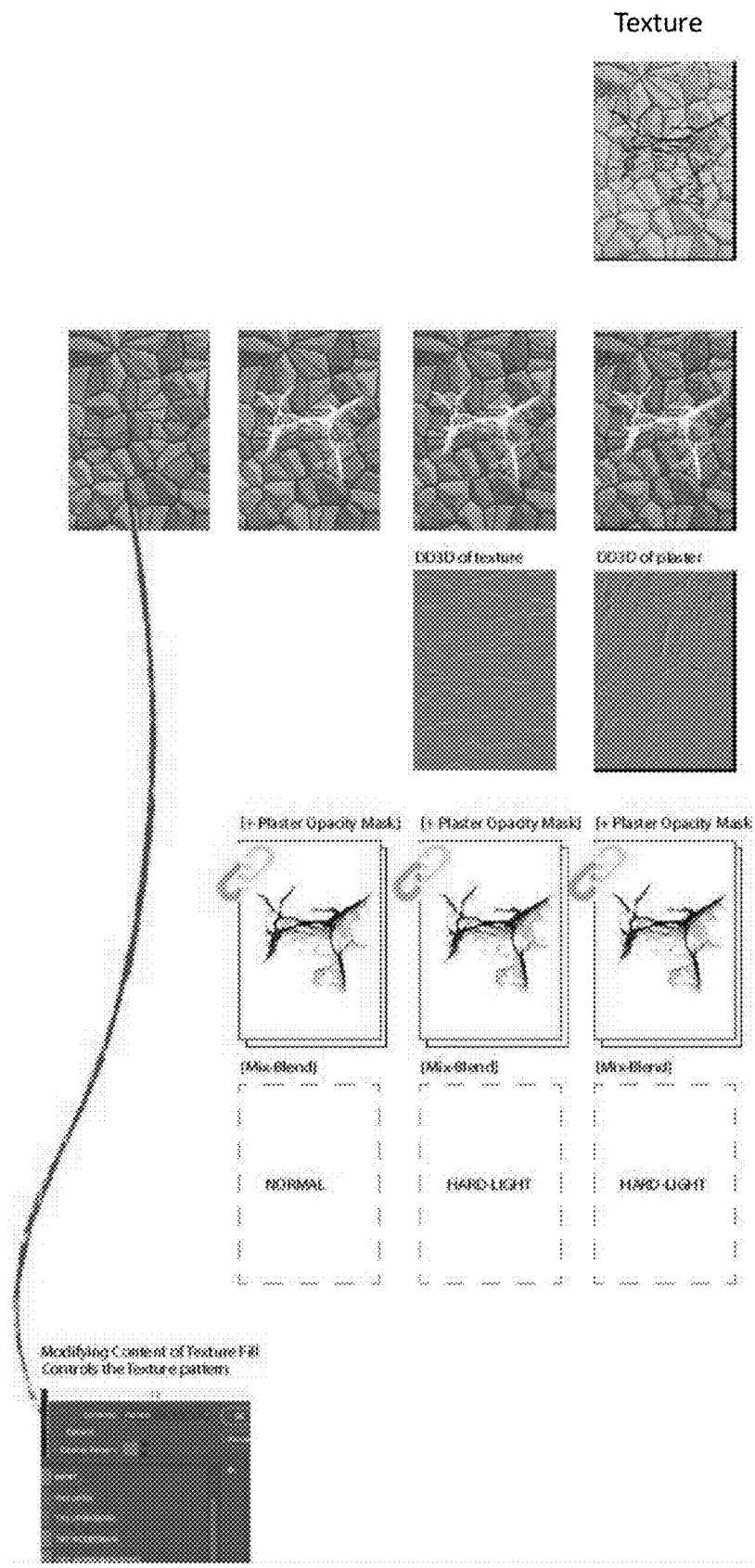
FIG. 9 is a diagram showing a texture cross-layer and its various components according to an embodiment of the invention.
Figure 10:
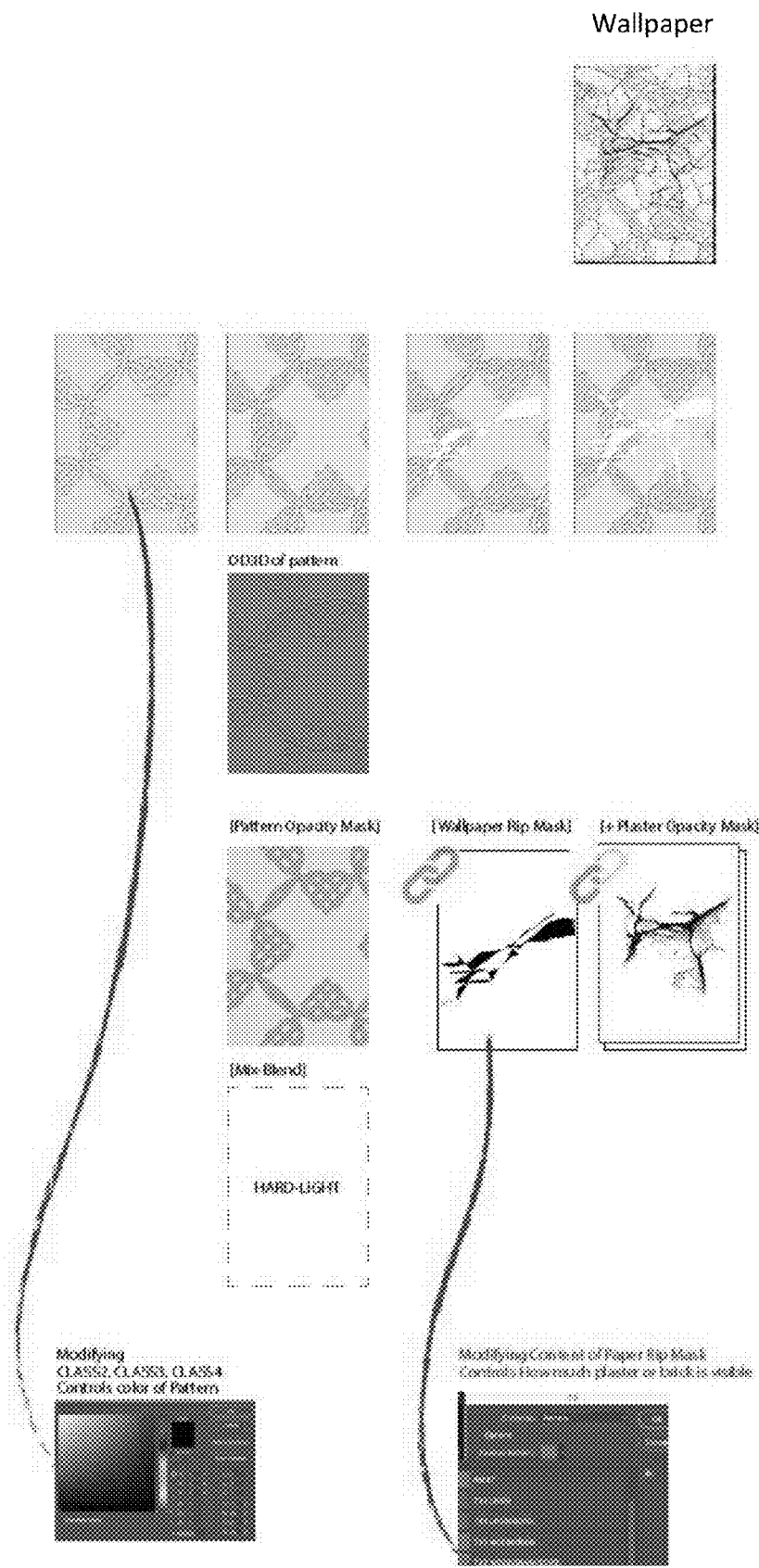
FIG. 10 is a diagram showing a wallpaper cross-layer and its various components according to an embodiment of the invention.
Figure 11:
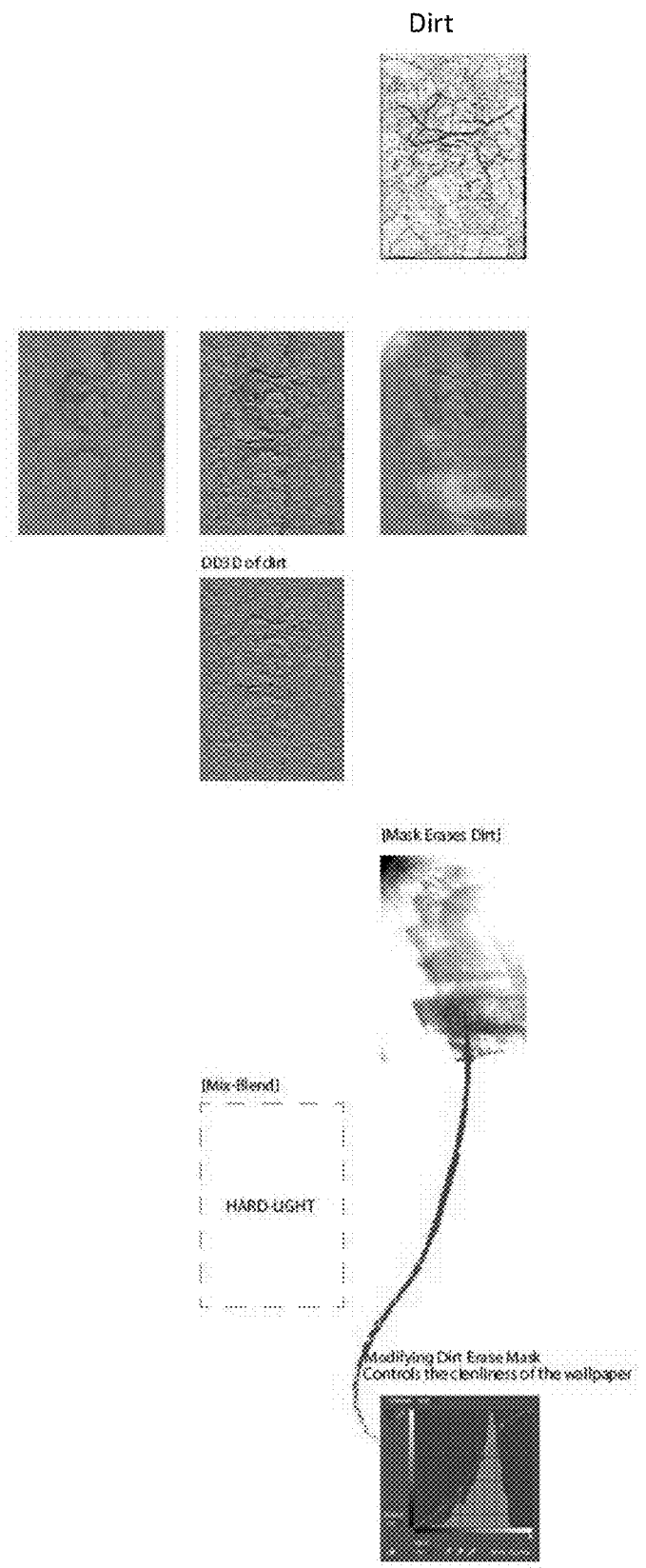
FIG. 11 is a diagram showing a dirt cross-layer and its various components according to an embodiment of the invention.

FIGS. 6-11 are schematic images which demonstrate the composition of a cross-layer and its interaction with other cross-layers; the following describes an overview of these figures. Each cross-layer of the virtual construction is shown in a separate figure with its various cross-elements, cross-links, cross-masks, etc. FIG. 6 show that the virtual construction starts with a brick cross-layer. A plaster or stucco cross-layer, shown in FIG. 7, is on top of the brick. Also, a crack is simulated and applied to the plaster. The plaster and all of its cross-elements is shown in FIG. 7 and as can be seen the crack results in appearance of the brick through the crack in the plaster. The plaster is colorized with a paint layer (shown in FIG. 8) and a texture layer (shown in FIG. 9) is applied to the paint. Then a wallpaper cross-layer (FIG. 10) is added as well as a dirt cross-layer (FIG. 11). The final product shown at the top of FIG. 11 includes the pattern of the wallpaper with all of the color combinations that are set. Dimension is added with a crack in the paper and the stucco and it can be seen that some stucco is visible because the crack in the paper is bigger than the crack in the wall that you can see the brick through, creating a realistic simulation. Each of the cross-layers in FIGS. 6-11 will be described in greater detail below.

The top of FIG. 6 shows a brick cross-layer in its final form. However, immediately below it, it can be seen in the second row from the top that the brick cross-layer comprises cross-elements such as brick image, an opacity element, and a 3D function element. Immediately below that in the third row, the DD3D file behind the 3D function element is shown, as well as the mask behind the opacity function. In the row below that, mix-blend interactions (normal and hardlight) are shown. Finally, in the last row, a function factor is shown which determines that the opacity level of DD3D from 0-100 determines the depth of the 3D effect.

The top of FIG. 7 shows a plaster cross-layer in its final form. The second row from the top shows that the plaster cross-layer is made up of a series of cross-elements which include a plaster image as well as interaction with previous layers and cross-elements representing damage to the plaster. The third row shows a DD3D image for plaster as well as a DD3D image for the damage. The fourth row shows a plaster opacity max that can superimposed on the images. The fifth row shows mix-blend effects (normal and hard-light). The last row shows that modification of the plaster damage mask controls the size of the crack displayed in the plaster cross-layer.

Figure 8:
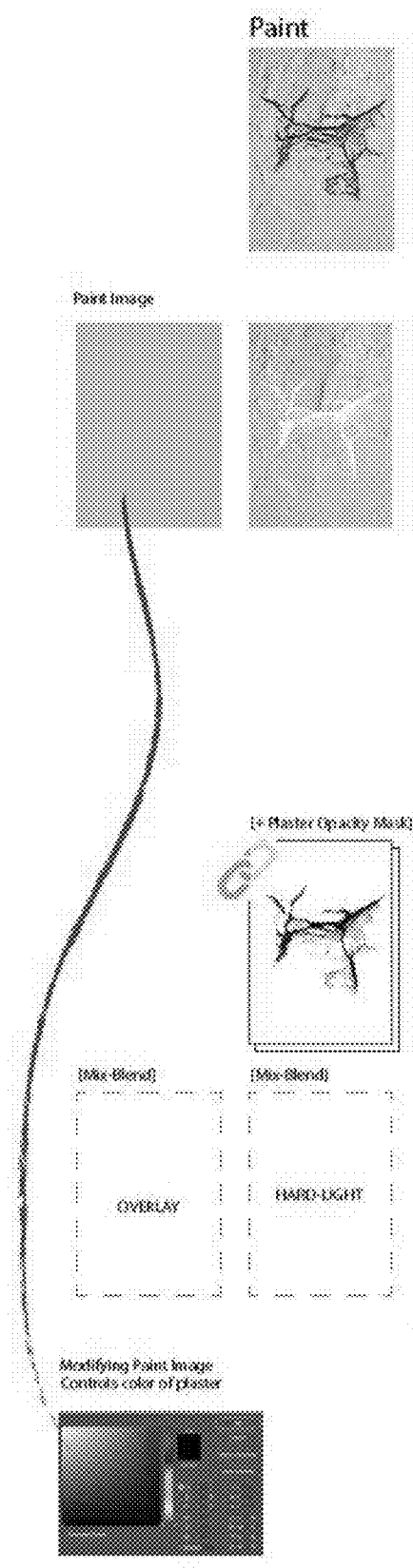
FIG. 8 is a diagram showing a paint cross-layer and its various components according to an embodiment of the invention.

At the top of FIG. 8, a paint cross-layer is shown in its final form. The second row from the top shows that the paint cross-layer comprises cross-elements including a paint image as well as interaction with the previous cross-layer (plaster). The third row shows that that the plaster opacity mask used in the previous (plaster) cross-layer is cross-linked onto the paint cross-layer. The fourth row shows mix-blend effects (overlay and hard light) are also introduced. The final row shows that modifying the paint image controls the color of the plaster cross-layer.

At the top of FIG. 9, a texture cross-layer is shown in its final form. The second row from the top demonstrates that the texture cross-layer comprises a texture fill pattern as well as other cross-elements, including interaction with the previous cross-layers. The third row shows introduction of 3D effects, including a DD3D of plaster and a DD3D of texture. The fourth row shows that a cross-link of the plaster opacity mask is introduced to produce a cracked effect. The fifth row shows the introduction of mix-blend effects, including normal and hard-light. The final row shows that modifying content of the texture fill controls the texture fill patterns displayed in the texture cross-layer.

At the top of FIG. 10, a wallpaper cross-layer is shown in its final form. The second row from the top shows that the wallpaper cross-layer comprises a pattern as well as other cross-elements, including 3D effects and cross-elements representing damage. A DD3D of the pattern, a pattern opacity mask, and hard light mix blend effects are shown in the next three rows (second column). Cross-links to a wallpaper rip mask and plaster opacity mask which influence the presentation of the final form of the wallpaper cross-layer are shown in the fourth row. The last row shows that (at left) modification of CLASS2, CLASS3, and CLASS4 controls color of the wallpaper pattern, and that (at right) modification of content of the wallpaper rip mask controls how much of the underlying plaster or brick layers are visible in the wallpaper cross-layer.

FIG. 11 shows a final cross-layer on top of the wallpaper cross-layer which represents dirt. The dirt cross-layer is made up of several cross-elements including a dirt pattern and a 3D cross-element produced by a DD3D representing dirt. Also included is a mask element which erases the dirt effect. The last row shows that modification of the dirt erase mask controls the cleanliness of the paper. The final presentation of all of the cross-layers and their interaction is shown by the image in the top row.

FIG. 12 is a table representing an embodiment of a detailed image construction, showing various cross-layers in the left column and simulated environmental effects for each cross-layer in the right column. FIG. 13 is a table representing an embodiment of a simplified image construction. The tables illustrate that various cross-layers or numbers of cross-layers can be selected as well as the types of environmental effects of each cross-layer that may be introduced. However, the invention is not limited to the cross-layers and environmental effects shown and a skilled artisan will appreciate variations of the image constructions shown.

The cross-layers can be generated such as that features in images representing real textures and surfaces in final form (e.g. display on a website) are reproduced at a 1:1 scale. Thus, a grain of sand or a light socket can be accurately documented and reproduced on the website at a 1:1 scale. However, in other embodiments, all of the features in the images are reproduced at less than 1:1 (e.g. 1:2, 1:3, 1:4) or greater than 1:1 (2:1, 3:1, 4:1) scale. In other embodiments, some of the features are displayed at a 1:1 scale and some are displayed at a scale that is lesser or greater than a 1:1 scale. For example, a starfish in an image can be displayed on the website larger or smaller than the original starfish.

The virtual substrate construction may be created in Adobe Illustrator (AI) or any other suitable graphic design program or vector image editor, such as Corel Draw X6, SVG-Edit, Inkscape, Serif DrawPlus, Sketch, Affinity Designer, and the like. Features of the virtual substrate construction may be created using various file formats representing images, including vector file formats such as AI, SVG, EPS, PDF, and raster or bitmap file formats including JPG/JPEG, PNG, GIF, BMP, and TIFF. AI file format is a proprietary file format developed by Adobe Systems for representing single-page vector-based drawings in either the EPS or PDF formats. SVG, or Scale Vector Graphics, is a vector image format which defines a pattern and allows for color control and embeds JPG and PNG. EPS (Encapsulated PostScript) is another Adobe format which is a common vector image format used in the print industry. PDF (Portable Document Format) is another Adobe format which supports vector images. JPG is a raster image format that may be in color or grayscale and is used for overlay effects like 3D. PNG is a raster image format that may be in color or grayscale and allows transparency, such as where solid to transparent overlay is needed such as aging.

The image files (e.g. AI, SVG, JPG, and PNG) may be utilized for publication on the internet on a website. As shown in the foregoing Example, the image files may allow a user to choose basic patterns of wallpaper on the website. The basic patterns can be any patterns used in a wallpaper design, including themes such as art deco, chevron, classic, cultural, digital, featured, geometric, kids, nature, paisley, plant, stripe, and themed. The user may then select and customize various features of a wallpaper patterns through the use of menus such as pulldown menus, as well as checkboxes, scrollbars, and other graphical features. Upon selection of the final design specifications chosen by a user of the website, which may include input of the wall width and height, wallpaper may be printed according to the chosen specifications that reflect the final design image on the web site. The wallpaper may be printed using advanced digital printing technology available in the art such as flatbed printing, UV curing systems, and the like. In addition, 3D effects may be introduced through CNC routing. The wallpaper may be printed on any suitable substrate, including vinyl, paper, vinyl-coated paper, or any other printable substrate.

File Format

Embodiments of the invention allow for control of design features with numeric control. The numerical control allows for selection and choice of qualitative and quantitative features in the design, as well as provides a format for two-dimensional and three-dimensional printing using a CNC (Computer Numeric Control) router. In order to affect design with numeric control it is necessary to utilize a file format with a standardized method of computer control.

Definition: ALPHA-COLOR: MASK; 3D; TEXTURE; AGING . . . the following standard is important to understand. An ALPHA-COLOR is applied as layers using MIX-BLEND tools like overlay; hard-light; multiply; and colorize. This method utilizes 50% luminosity (hexadecimal: 7F7F7F) as NULL EFFECT. Values higher than 50% luminosity indicate a positive in effect; a value of 50% will have no effect; a value lower than 50% luminosity will have a negative effect. Additionally, ALPHA-COLOR can ADD color where at LUMINOSITY 50%; SATURATION=10%; HUE=60° (yellow): the 50% luminosity means there will be neither lightening nor darkening; the 10% saturation and 60° hue means the underlying image will be influenced by a 10% yellow color.

The following describes an embodiment of a process for Image Optimization and Preparation For Color Control:

1. VECTOR COOKIE CUT: Apply "cookie cutter" process. Overlapping SVG VECTOR objects should not overlap. Adobe Illustrator TRIM function should be applied so overlapping objects cut through each other; no object will overlap with another.

2. COLOR CLASS: COPY vectors and visually group the COOKIE CUT art into logical color CLASS groups. [Generally, making the minimum number of color CLASSes will simplify user experience. The inventors have found that 3 color CLASSes are an optimal balance between color options and simplicity]. Optimize SVG to minimize points—improves performance. Each COLOR CLASS is controlled by a single HEXADECIMAL value. A three CLASS SVG will have refer to CLASS2; CLASS3; CLASS4. These classes are layered with Adobe CSS MIX-BLEND; overlay; colorize in order to affect color as desired.

3. SHAPE DETAIL: [alpha-color] Provides nuance and detail to COLOR CLASS by affecting luminance from lighter to darker. Applied with Adobe MIX-BLEND; hardlight; multiply; overlay . . . etc.

4. COLOR CLUSTER: [alpha-color] Provides RELATIVE color variance to COLOR CLASS. This enables the single HEXADECIMAL value to affect a group of colors.

5. 3D RELIEF DATA: When CLASS2=25% gray; CLASS3=60% gray; CLASS4=75% gray values provide the same differentials determining PATTERN OPACITY. The shadow between background CLASS2=25% will be more prominent due to 35% differential to CLASS3=60% and CLASS4=75% at 15% differential appear closer to one another. It is important to note that 0%-25% and 75%-100% are deliberately left empty to allow for exceptions where extreme differential is required.

Provides depth information used for:

1. 3D shading: printed bevel effect.

2. Generate CNC ROUTER G-code for 3 to 5 axis 3D routing.

3. Generate 3D printing data.

4. Influence effects of filters and overlays by fading the effects of these.

6. PATTERN OPACITY: Provides opacity information. Can control the effects onto the pattern of layers such as texture; aging. With CLASS2 set to 25% opacity; CLASS3 set to 60% opacity; CLASS4 set to 75% opacity. This provides a standard where; the apparent background [CLASS2] of a pattern is a very see-through 25% and therefore allows texture to be clearly visible; the apparent next color "up" [CLASS3] is set to 60% which offsets by 35% to CLASS2; the apparent top layer is set to 75% which will be mostly opaque and only 15% different than CLASS3. The 35% difference causes CLASS2 to appear further back than the 15% more closely grouped CLASS3 and CLASS4.

Pattern is now ready with 3 main files:
3C_ASR12345.SVG—allows color control
3C_ASR12345_MASK.PNG—provides opacity of SVG
3C_ASR12345_3D.jpg—provides 3D
3C_ASR12345_VARNISH.jpg—defines shot varnish
3C_ASR12345_WHITE.jpg—defines white layer
3C_ASR12345_ROUTER.rou—defines router bit categories
3C_ASR12345_definessomething.any—container for predetermined factors: e.g. CNC function such as router bit class; manufacturing variable; etc.

File Intake

Figure 14:
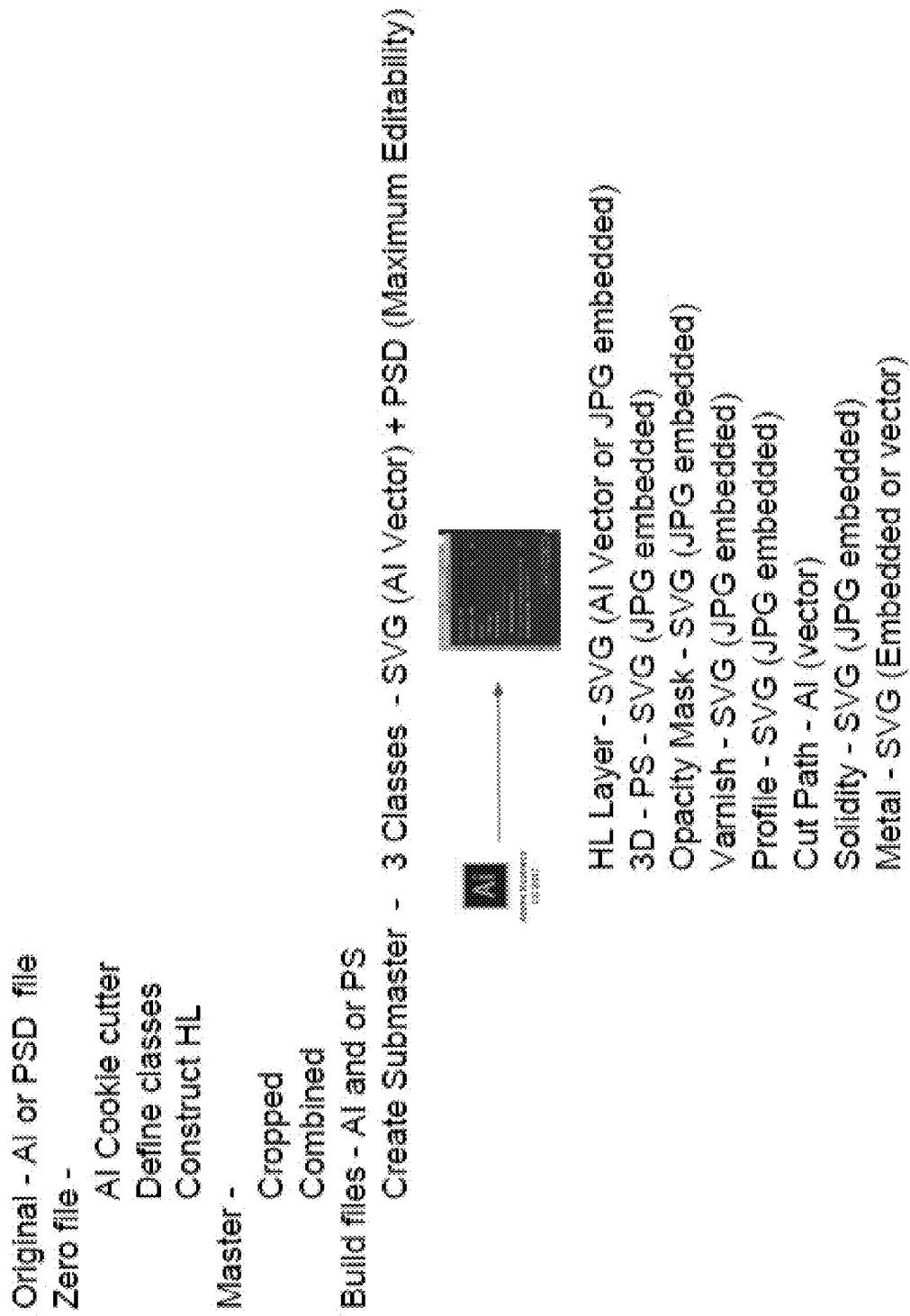
FIG. 14 is an outline showing a general file intake process according to an embodiment of the invention.

FIG. 14 shows an outline of an embodiment of a general file intake process for use in the invention. The process starts with an original AI or PSD (Photoshop Document, a layered image file used in Adobe PhotoShop) file. Then, an AI Zero file is created in which the AI cookie cutter process is applied, classes are defined, and a HL is constructed. Then, an AI Master file is created in which the images are cropped and combined. Then, the various build files are created as AI or Photoshop files. These include the HL layer, 3D, Opacity Mask, Varnish, Profile, Cut Path, Solidity, and Metal. The various file formats for each build file are shown. Finally, WordPress files are generated, which include SVG, JPG, and PNG.

FIGS. 15-23 are flowcharts showing embodiments of individual file intake processes including those for various layers. The file intake processes allow for the production of files suitable for publication on the internet on a website.

Figure 15:
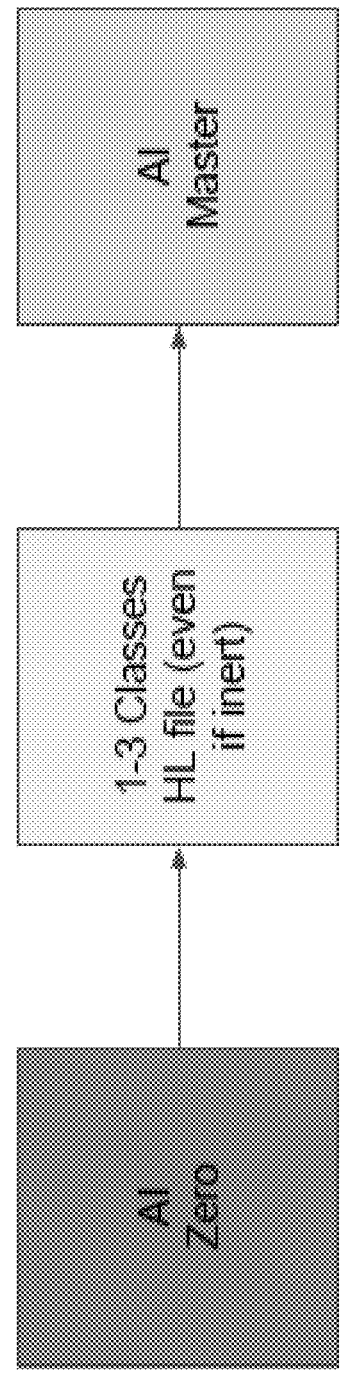
FIG. 15 is a flowchart showing a process of creating an AI Master file from an AI Zero file according to an embodiment of the invention.

FIG. 15 shows an embodiment of a process of creating an AI Master file from an AI Zero file. As shown, an AI Zero file is converted to an AI Master file by way of a HL file comprising 1-3 classes.

Figure 16:
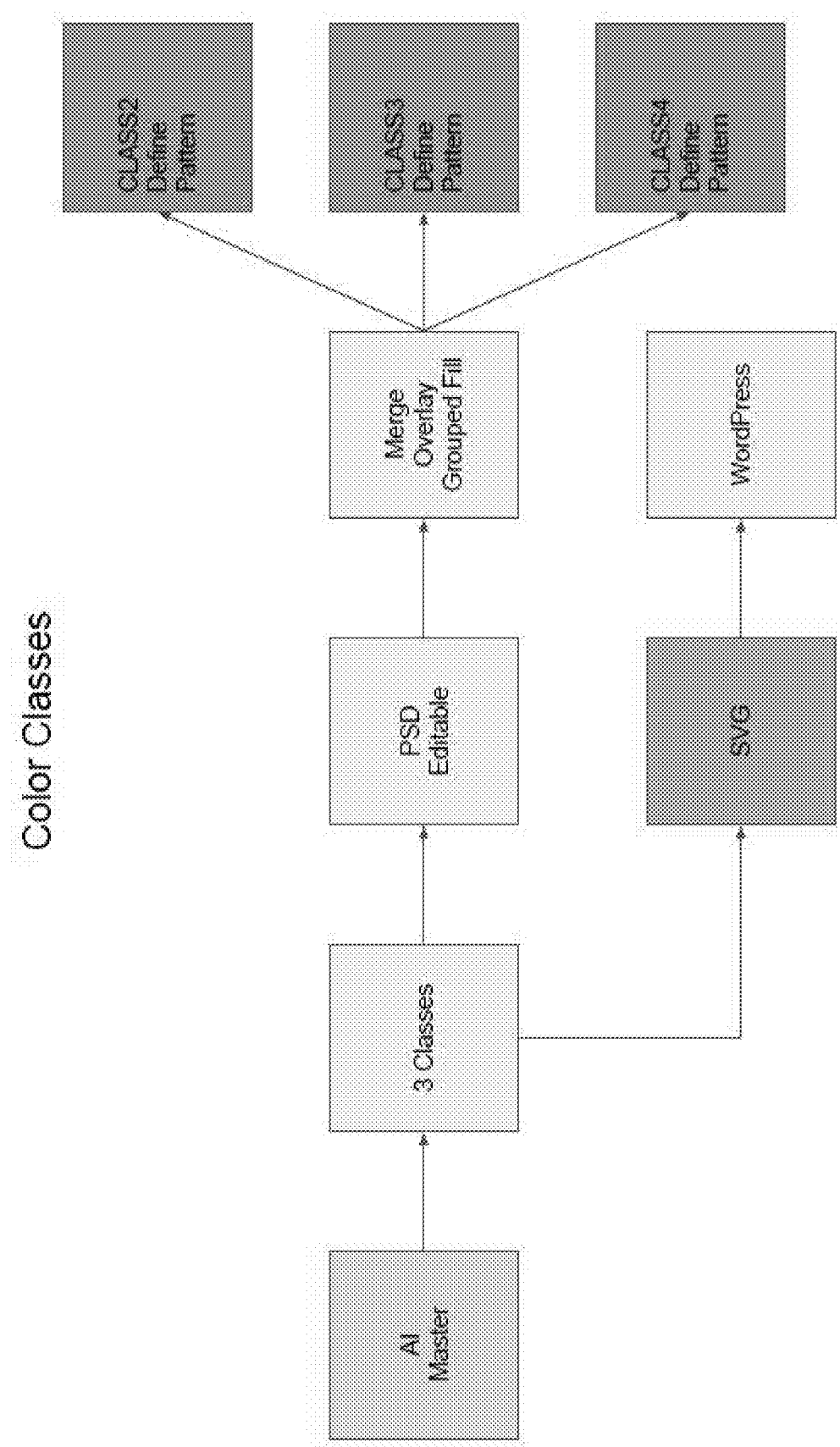
FIG. 16 is a flowchart showing a process of creating of a Color Classes SVG file from an AI Master file according to an embodiment of the invention.

FIG. 16 shows an embodiment of a process of creating of a Color Classes SVG file from an AI Master file in which three color classes (CLASS2, CLASS3, and CLASS4) are represented. As shown, the AI Master file with three classes is converted to a PSD editable file where functions such as merge, overlay, and grouped fill are performed. The three classes are designated as CLASS2, CLASS3, AND CLASS4 and each class defines an individual pattern. The three-class AI Master file is converted to an SVG file for publication on Wordpress.

Figure 17:
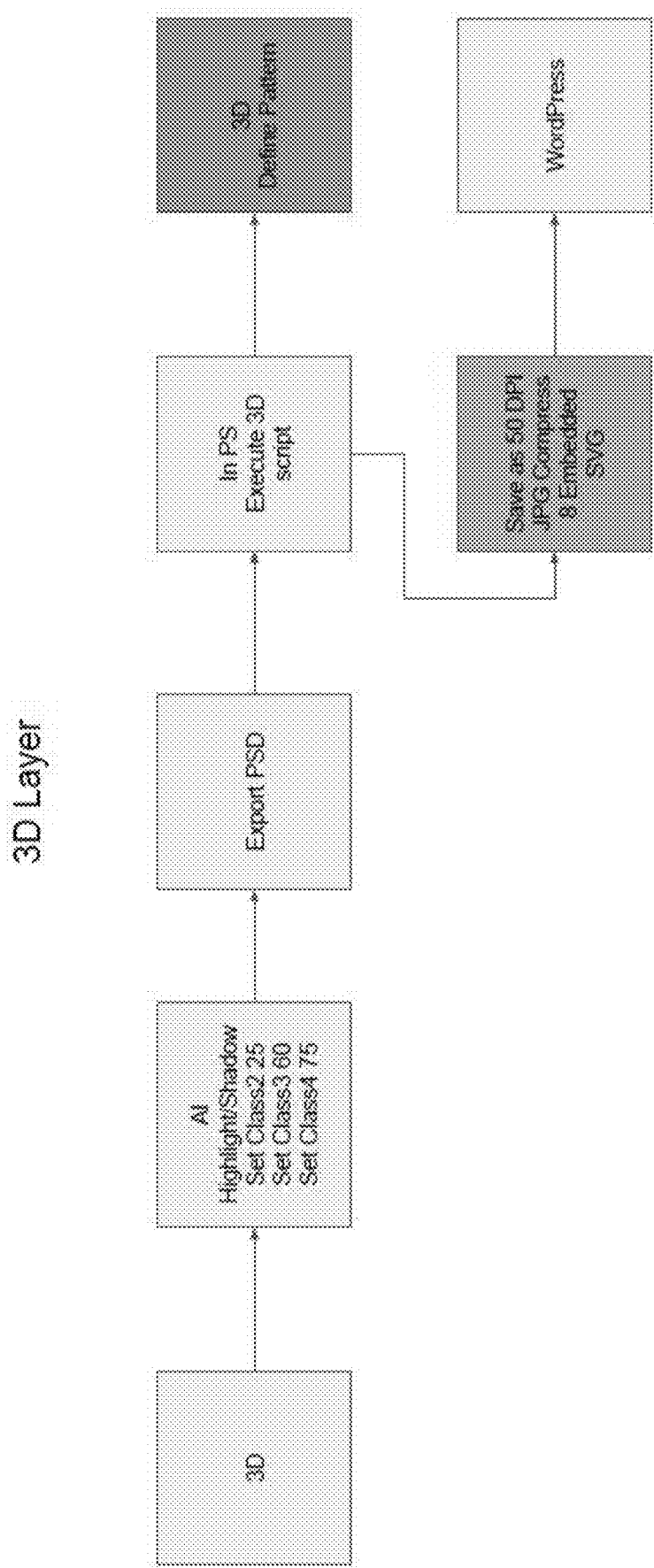
FIG. 17 is a flowchart showing a process of creating a 3D Layer SVG file according to an embodiment of the invention.

FIG. 17 shows an embodiment of a process of creating a 3D Layer SVG file. In this embodiment, the AI Master file creates highlighting and shadow effects by setting Class2 to 25, Class 3 to 60, and Class 4 to 75. The file is then exported as a PSD file. In Photoshop a 3D script is executed which defines a 3D pattern. The file is saved as 50 DPI JPG Compress 8 embedded SVG file for publication on Wordpress.

Figure 18:
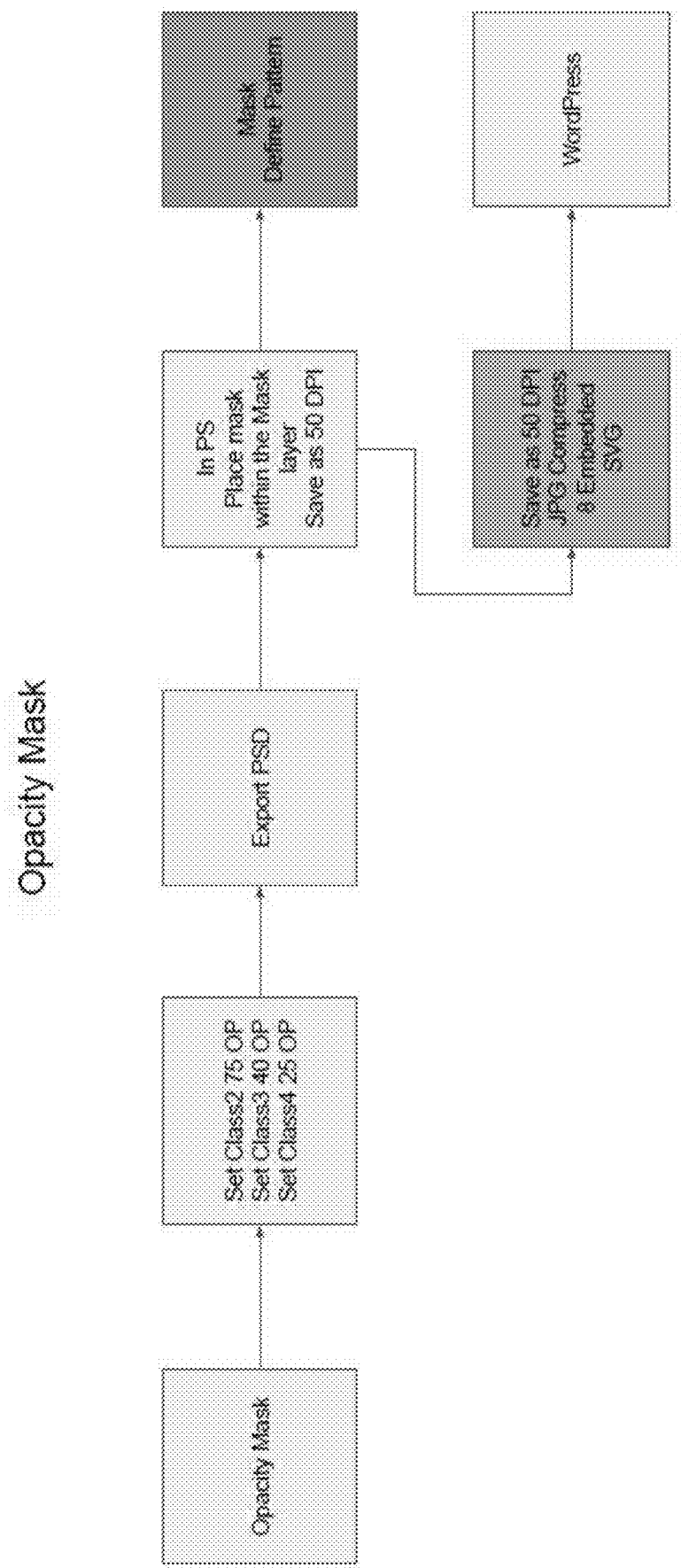
FIG. 18 is a flowchart showing a process of creating a SVG opacity mask file according to an embodiment of the invention.

FIG. 18 shows an embodiment of a process of creating a SVG opacity mask file. In this embodiment, the AI Master file creates an opacity mask by setting Class2 to 75 OP, Class3 to 40 OP, and Class4 to 25 OP. The file is then exported as a PSD file. In Photoshop, the mask is placed within the mask layer and saved as 50 DPI which defines the mask pattern. The file is then saved as a 50 DPI Compress 8 embedded SVG file for publication on WordPress.

Figure 19:
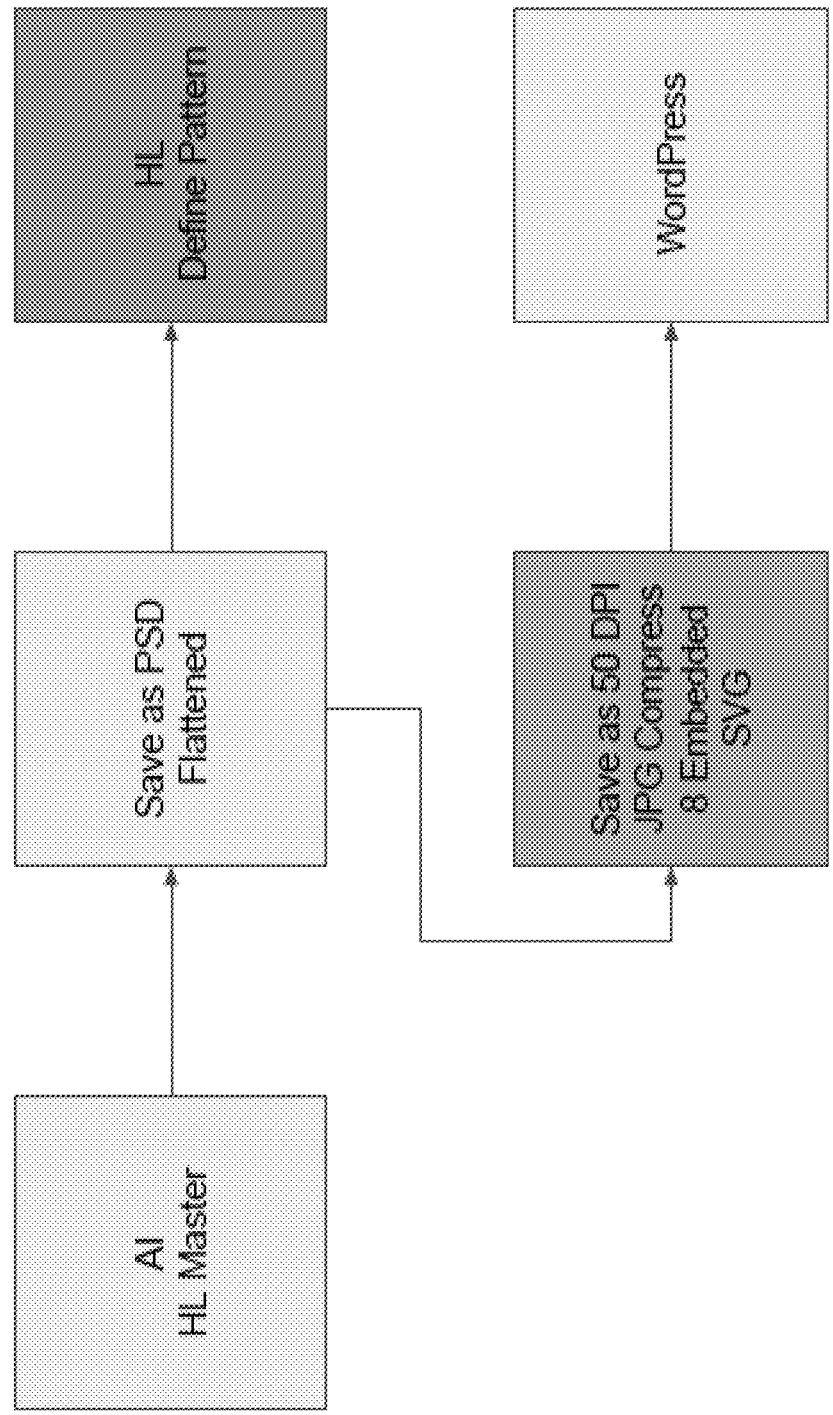
FIG. 19 is a flowchart showing a process of creating a HL SVG file according to an embodiment of the invention.

FIG. 19 shows an embodiment of a process of creating a HL SVG file. The AI HL Master file is saved as a PSD flattened file which defines the HL Pattern. The file is then saved as a 50 SPI JPG Compress 8 Embedded SVG file for publication on WordPress.

Figure 20:
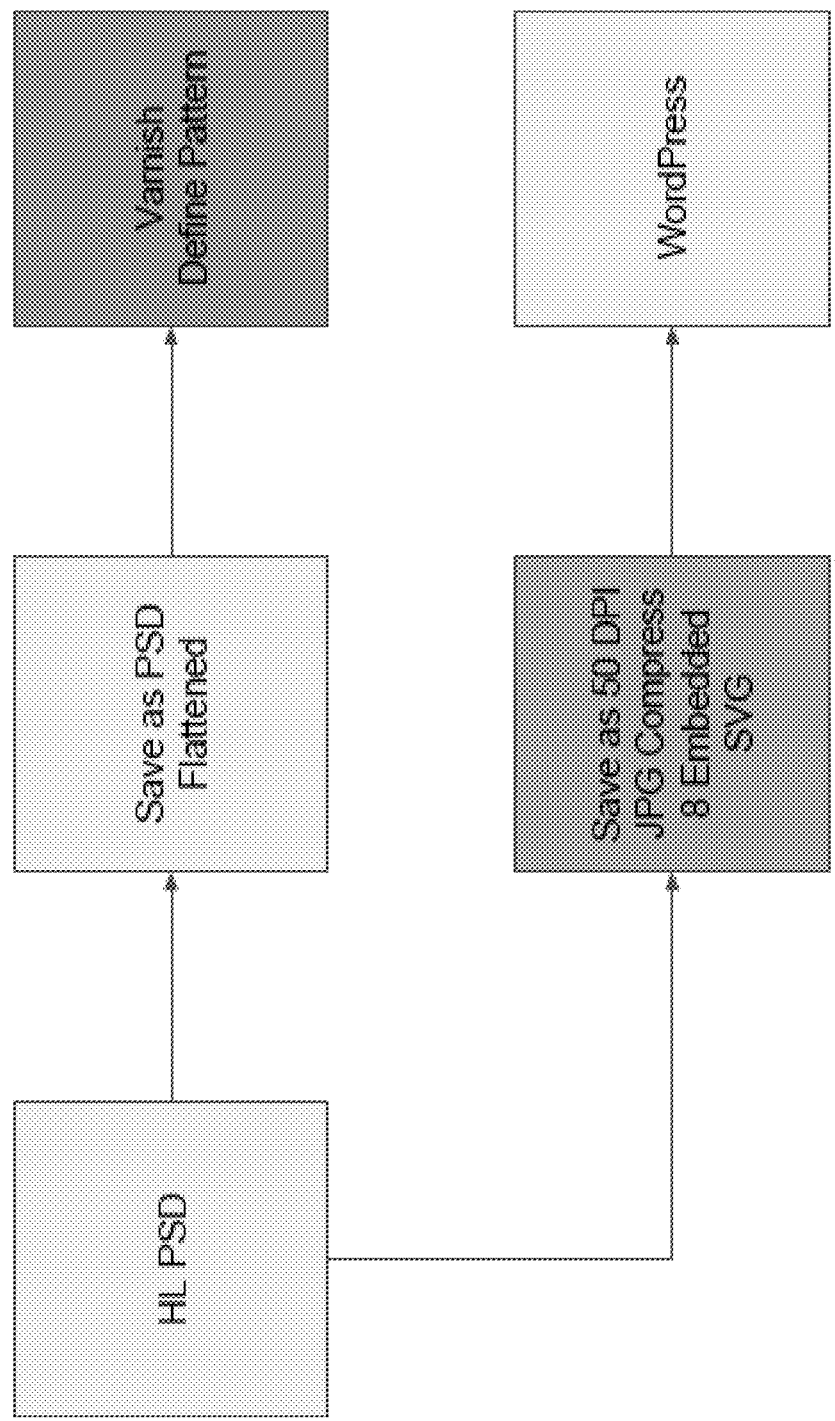
FIG. 20 is a flowchart showing a process of creating a Varnish SVG file according to an embodiment of the invention.

FIG. 20 shows an embodiment of a process of creating a Varnish SVG file. The HL PSD file is saved as a PSD flattened file which defines the varnish pattern. The HL PSD file is then saved as a 50 DPI Compress 8 embedded SVG file for publication on WordPress.

Figure 21:
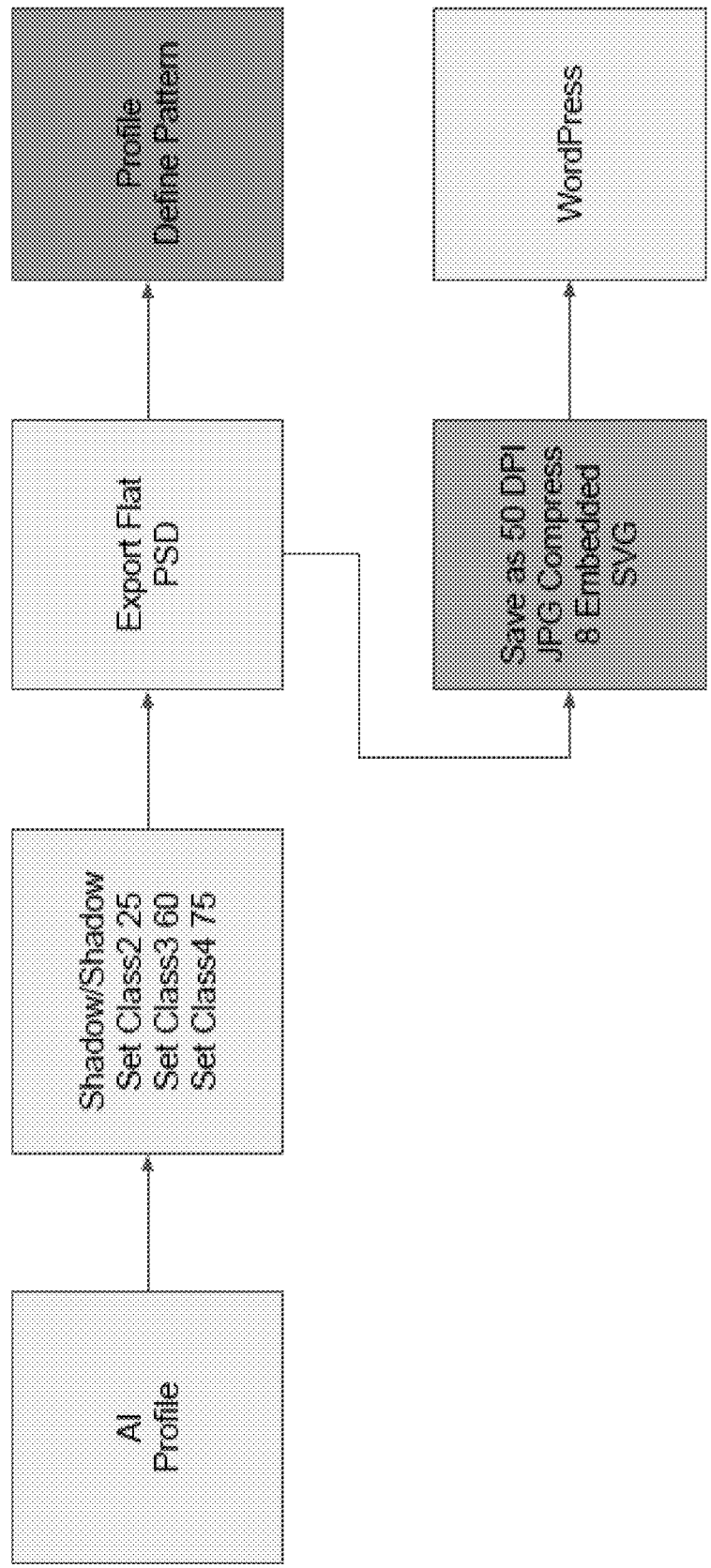
FIG. 21 is a flowchart showing a process of creating a Profile Layer SVG file according to an embodiment of the invention.

FIG. 21 shows an embodiment of a process of creating a Profile Layer SVG file. In the AI profile file, Class2 is set to 25, Class3 is set to 60, and Class4 is set to 75 to create shadow effects. The AI profile file is then exported to a flat PSD file which defines the profile pattern. The PSD file is then saved as a 50 DPI Compress 8 embedded SVG file for publication on WordPress.

Figure 22:
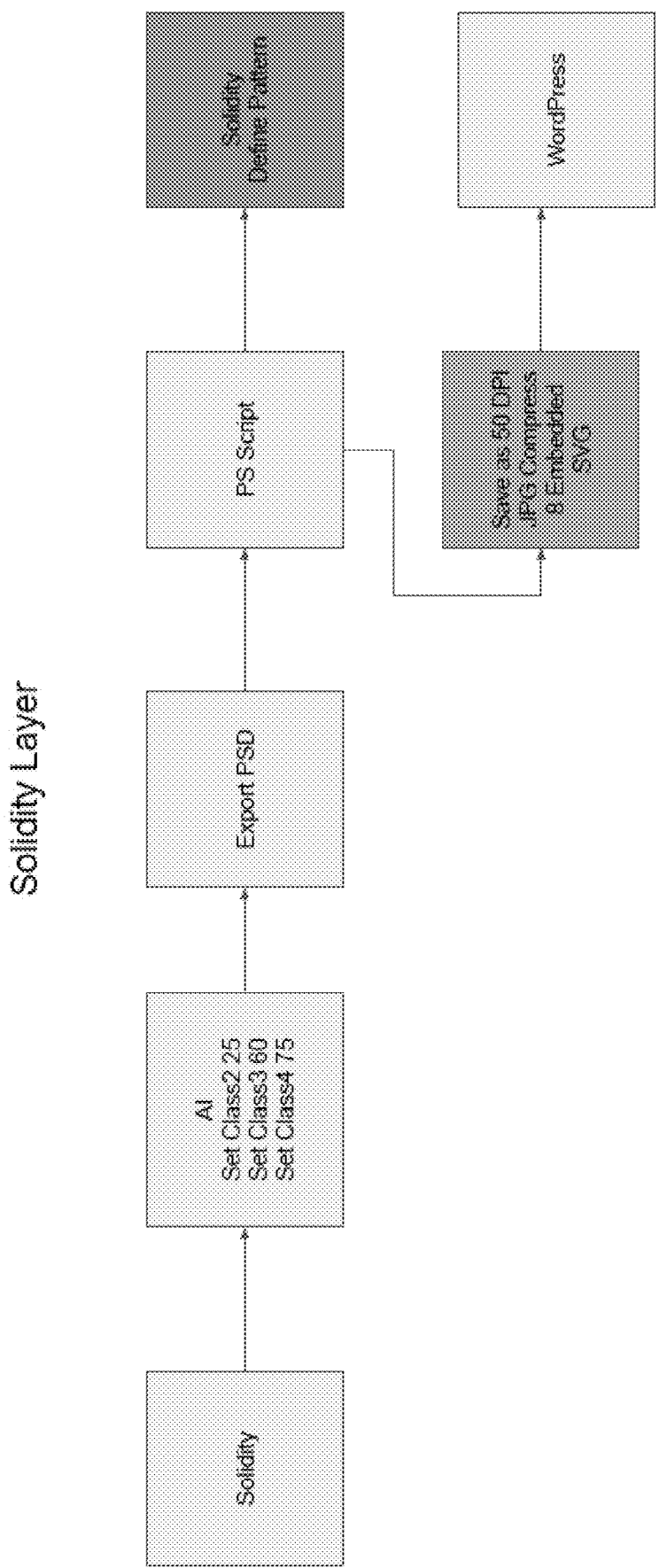
FIG. 22 is a flowchart showing a process of creating a Solidity Layer SVG file according to an embodiment of the invention.

FIG. 22 shows an embodiment of a process of creating a Solidity Layer SVG file. In the AI solidity file, Class2 is set to 25, Class3 is set to 60, and Class4 is set to 75. The AI solidity file is then exported to a PSD file where a Photoshop script is executed which defines the solidity pattern. After execution of the script, the PSD file is then saved as a 50 DPI Compress 8 embedded SVG file for publication on WordPress.

Figure 23:
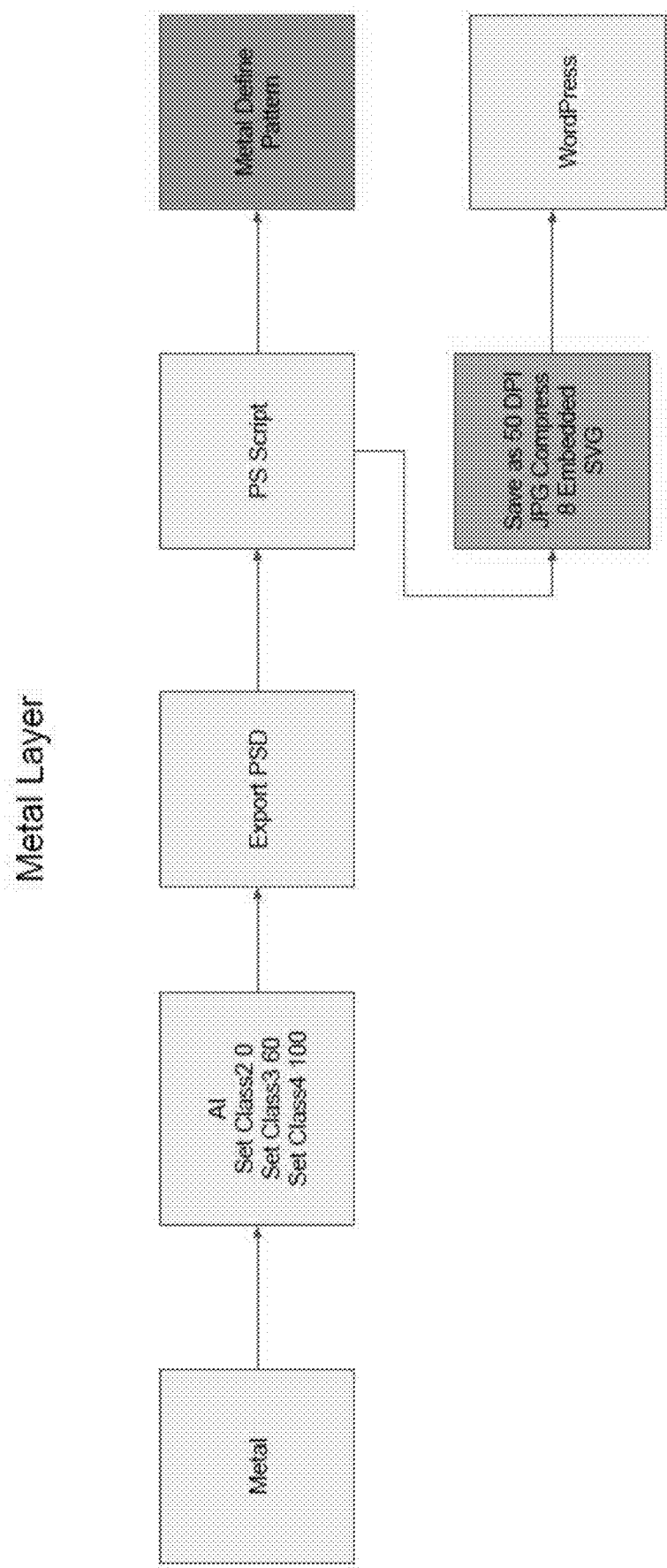
FIG. 23 is a flowchart showing a process of creating a Metal Layer SVG file according to an embodiment of the invention.

FIG. 23 shows an embodiment of a process of creating a Metal Layer SVG file. In the AI metal file, Class2 is set to 0, Class3 is set to 60, and Class4 is set to 100. The AI metal file is then exported to a PSD file where a Photoshop script is executed which defines the metal pattern. After execution of the script, the PSD file is then saved as a 50 DPI Compress 8 embedded SVG file for publication on WordPress.

Computer Systems

Additional embodiments of the invention include a computer system for carrying out the method of this disclosure. The computer system may comprise a processor (CPU) for executing the computer-executable instructions (e.g. software) for carrying out the method of the invention as well as an input/output interface or user interface. The computer system can include a mainframe computer, desktop computer, web server, database server, laptop, tablet, netbook, notebook, personal digital assistant (PDA), gaming console, e-reader, smartphone, or smartwatch, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network.

Other components of the computer system can include a graphics processing unit (GPU), and non-transitory computer readable storage media such as RAM and a conventional hard drive. Other components of the computer system can include a database stored on the non-transitory computer readable storage media for storing the image files and other information described herein. As used in the context of this specification, a "non-transitory computer-readable medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM. The non-transitory computer readable media can include a set of computer-executable instructions for providing an operating system as well as a set of computer-executable instructions, or software, for implementing the methods of the invention. Embodiments of the invention include any non-transitory computer readable storage media that comprises the computer-executable instructions, image files, and/or other information described herein.

In one embodiment, the computer system includes a central computer such as a web server connected to the internet that has the computer-executable instructions stored in memory that is operably connected to an internal electronic database which stores the image files and other information described herein. The central computer may perform embodiments of the computer-implemented method of the invention based on input and commands received from remote computers through the internet. The central computer may effectively serve as a server and the remote computers may serve as client computers such that the server-client relationship is established, and the client computers issue commands or receive output from the server over a network. The commands may be issued over a graphical user interface (GUI) and may cause the server to display various patterns and features of wallpaper for selection by a user at a client computer. The client computers may execute commands to the server through any suitable network described herein. The client computer may have an internet browser such as Microsoft Edge, Mozilla Firefox, Google Chrome, Opera, Vivaldi, and the like and may access the central computer/server through an internet address that calls up a webpage. The commands may be issued through various features of a GUI displayed on the webpage as described below.

The GUI may be used in conjunction with the computer-readable code of the invention and electronic databases. For example, the graphical user interface may allow a user to select wallpaper patterns and various features of wallpaper as described herein (such as color effects, interactions with other substrates, environmental effects, aging effects, 3D effects, texture effects, and the like), or other input and display patterns of wallpaper or other output of the computer-implemented method of the invention. The graphical user interface may allow a user to perform these tasks through the use of text fields, check boxes, pull-downs, command buttons, drop-down menus, sliders, color palettes and the like. A skilled artisan will appreciate how such graphical features may be implemented for performing the tasks of this disclosure. The GUI may be accessible through a computer connected to the internet. In one embodiment, the GUI is accessible by typing in an internet address through an industry standard web browser and logging into a web page. The user interface may then be operated through a remote computer (client computer) accessing the web page and transmitting commands or receiving output from a server through a network connection.

Such graphical controls and components are reusable class files that are delivered with a programming language. For example, pull-down menus may be implemented in an object-oriented programming language wherein the menu and its options can be defined with program code. Further, some programming languages integrated development environments (IDEs) provide for a menu designer, a graphical tool that allows programmers to develop their own menus and menu options. The menu designers provide a series of statements behind the scenes that a programmer could have created on their own. The menu options may then be associated with an event handler code that ties the option to specific functions. Text fields, check boxes, and command buttons may be implemented similarly through the use of code or graphical tools. A skilled artisan can appreciate that the design of such graphical controls and components is routine in the art.

The computer-executable instructions (also referred to herein as computer-readable code) that may be used to implement the methods of the invention may be programmed in any suitable programming language, including JavaScript, C, C#, C++, Java, Python, Perl, Ruby, Swift, Visual Basic, PHP, and Objective C.

The Example below demonstrates how an embodiment of the invention is implemented through a computer system, and more particularly as it is implemented on an internet website.

EXAMPLE

The following Example shows an embodiment of the invention as it is implemented on a website (i.e. "Digital Décor") for selecting and purchasing wallpaper. The Example is provided to illustrate the invention and should not be construed as limiting.

Figure 24:
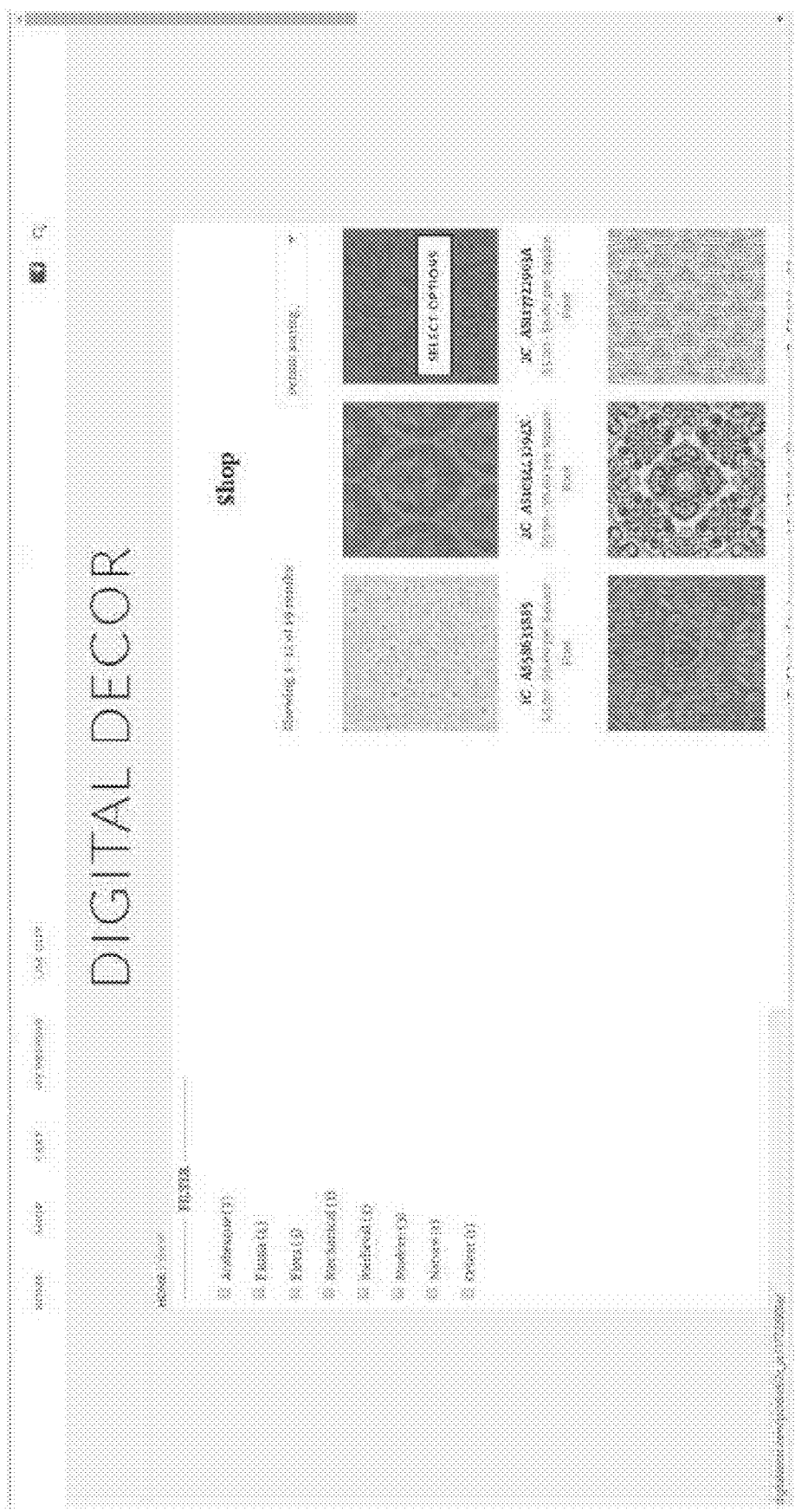
Figure 25:
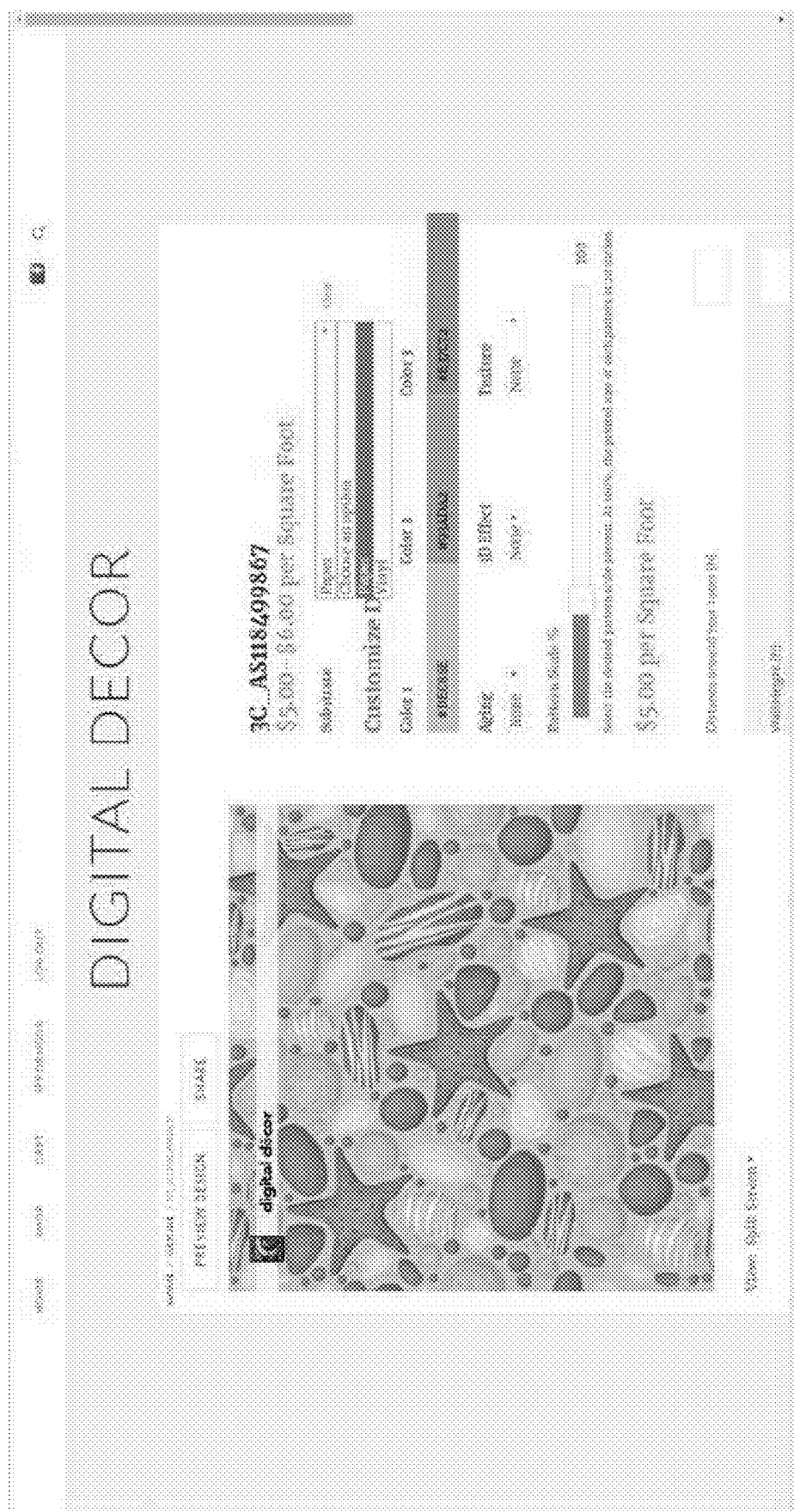

FIGS. 24-51 are screenshots showing various examples of how the invention is implemented on a website. FIG. 24 shows that at users of the website are able to browse different patterns of wall paper. Once they find a pattern they like they can click on Select Options. FIG. 25 shows that with the pattern selected, the user can select whether they want the substrate to be Paper or Vinyl using a drop down menu. The pattern scale (e.g. 0 to 200%) can also be adjusted through the vertical scroll bar shown. The pattern scale can magnify or reduce the size of the basic pattern and show how the pattern appears on a wall according to the level of magnification selected.

Figure 26:
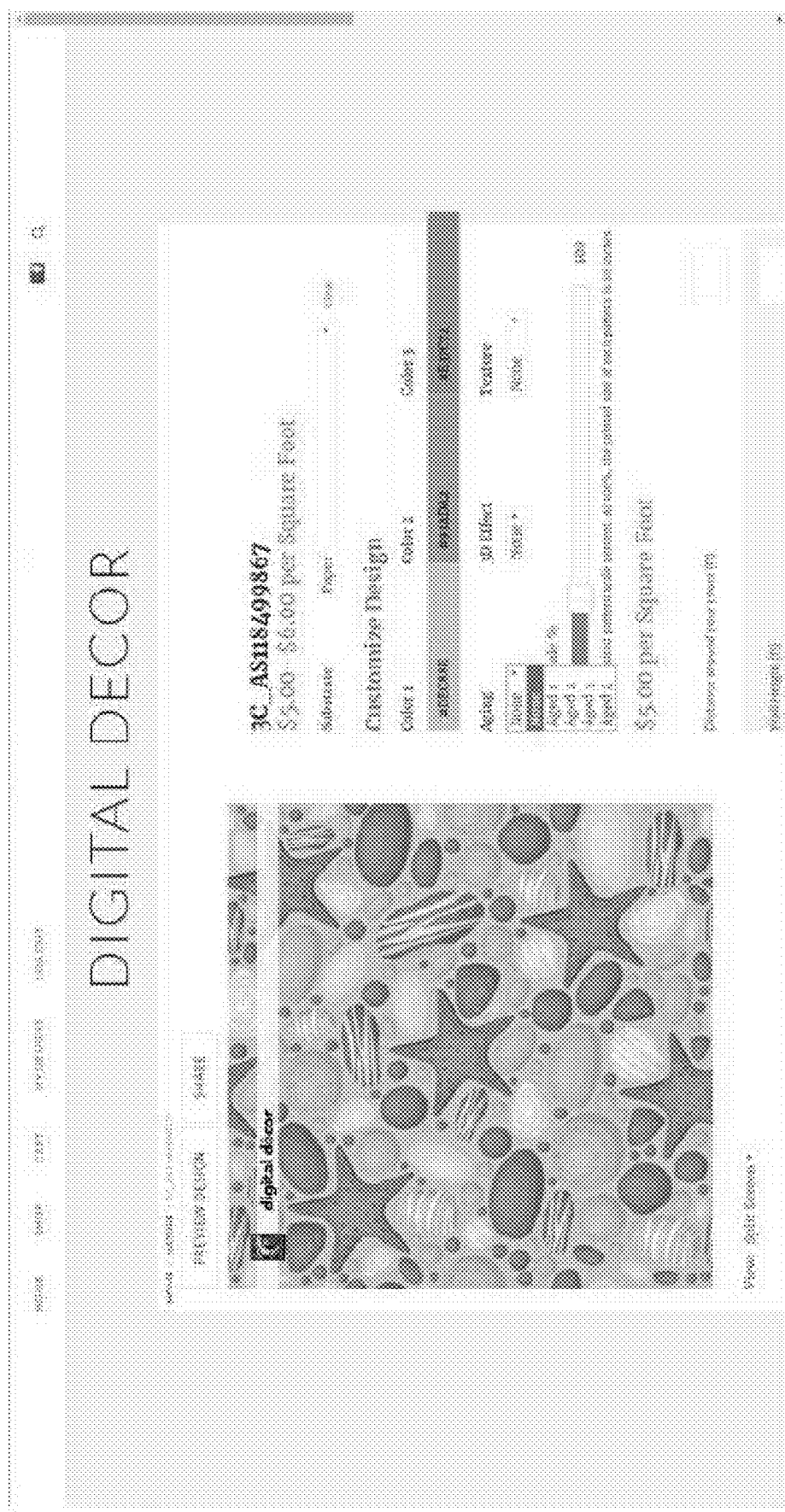
Figure 27:
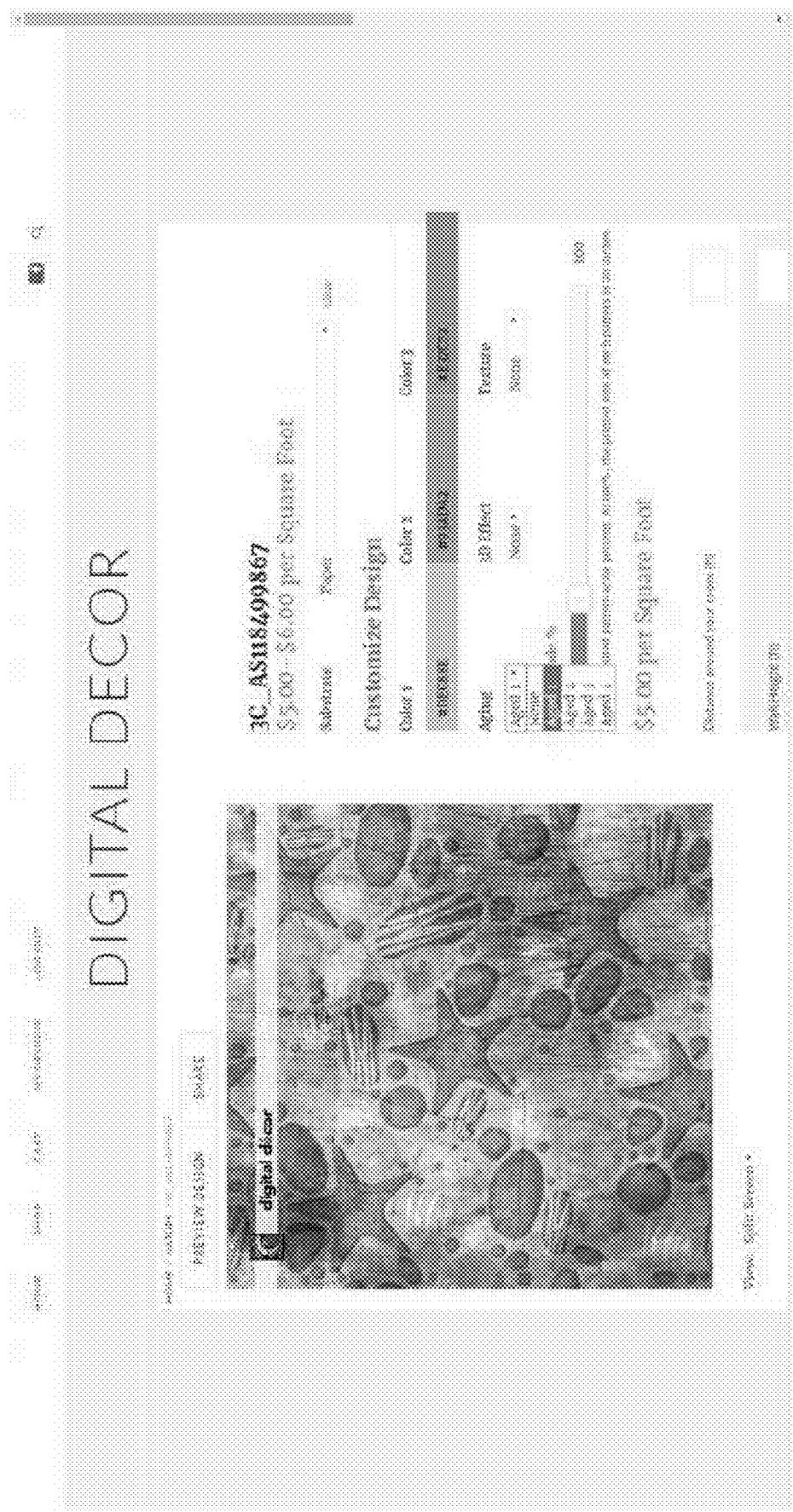
Figure 28:
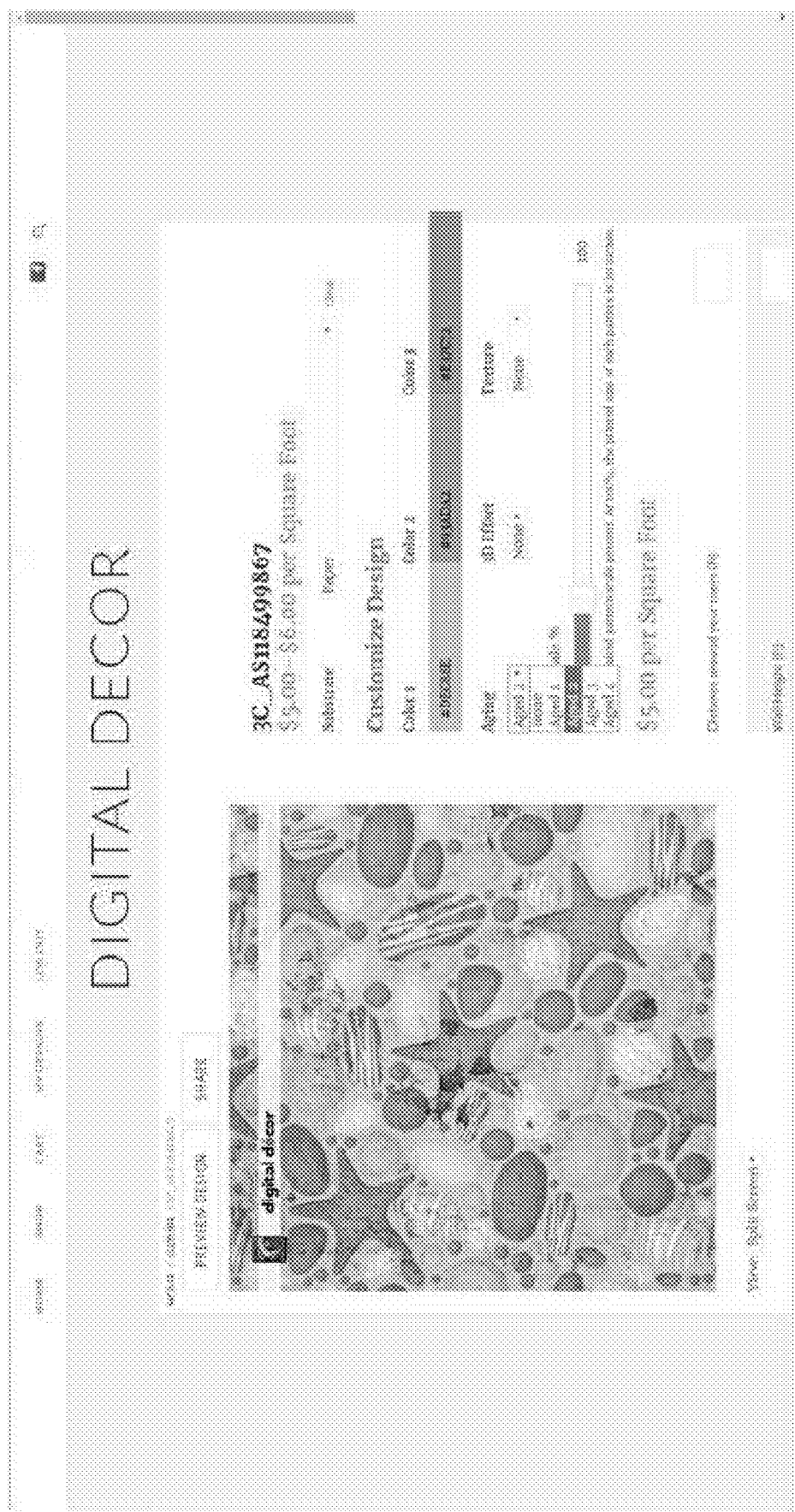
Figure 29:
Figure 30:
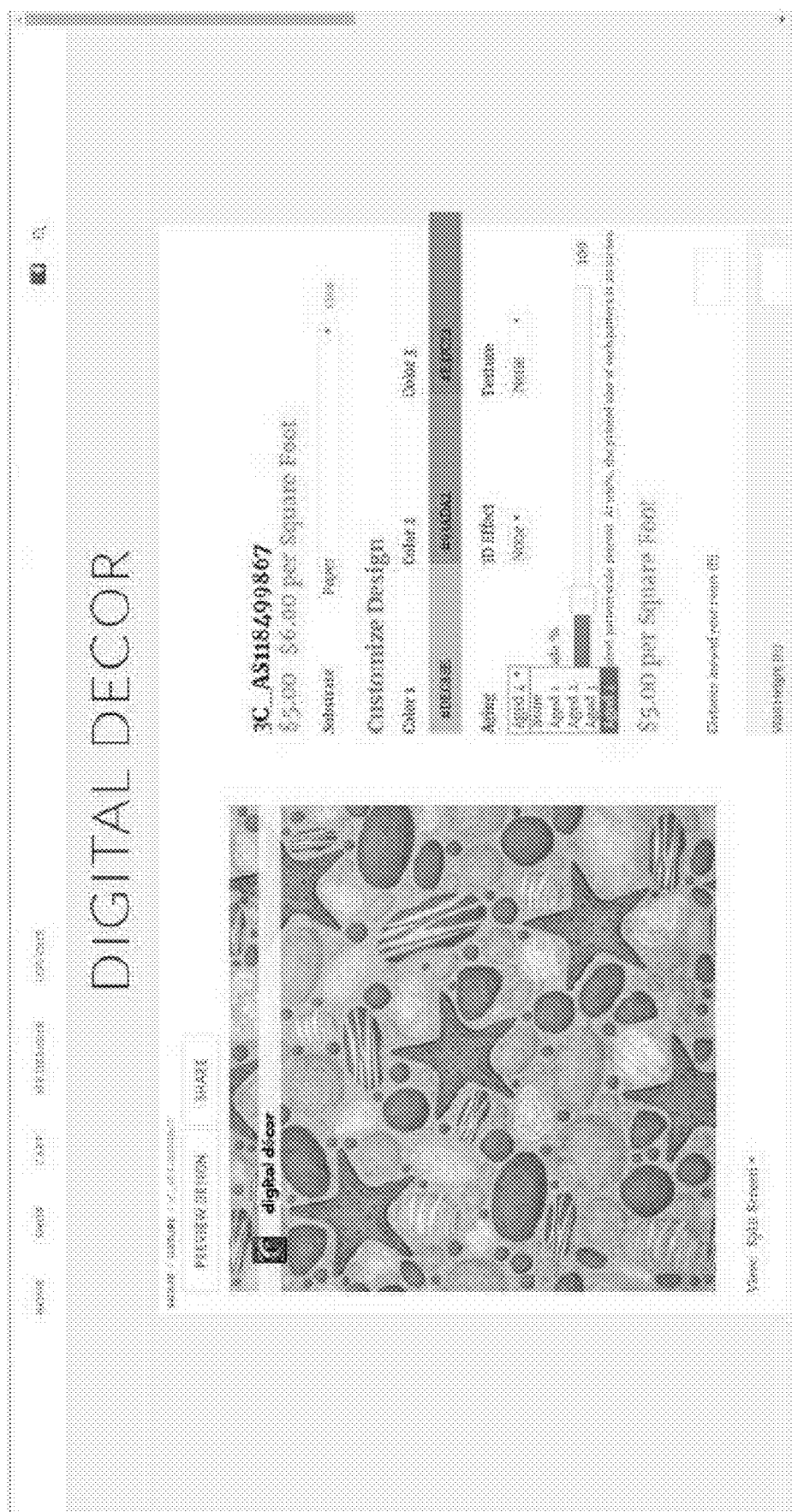

FIG. 26 shows that the user can select the level of aging "look" they prefer from different options, and FIG. 27 shows the pattern as it appears when the Aged 1 option is selected. Similarly, FIGS. 28-30 show the pattern as it appears when the Aged 2, Aged 3, and Aged 4 options are selected, respectively. However, embodiments may include alternatives to these choices, such as "Lived-In", "Water Damage", "Antique", and "Ancient", or any of the other environmental or aging effects described in this disclosure. For example, the aged options could include other damage (e.g. UV, dirt, smoke) or may be presented as number of years (e.g. 5, 10, 20) of damage.

Figure 31:
Figure 32:
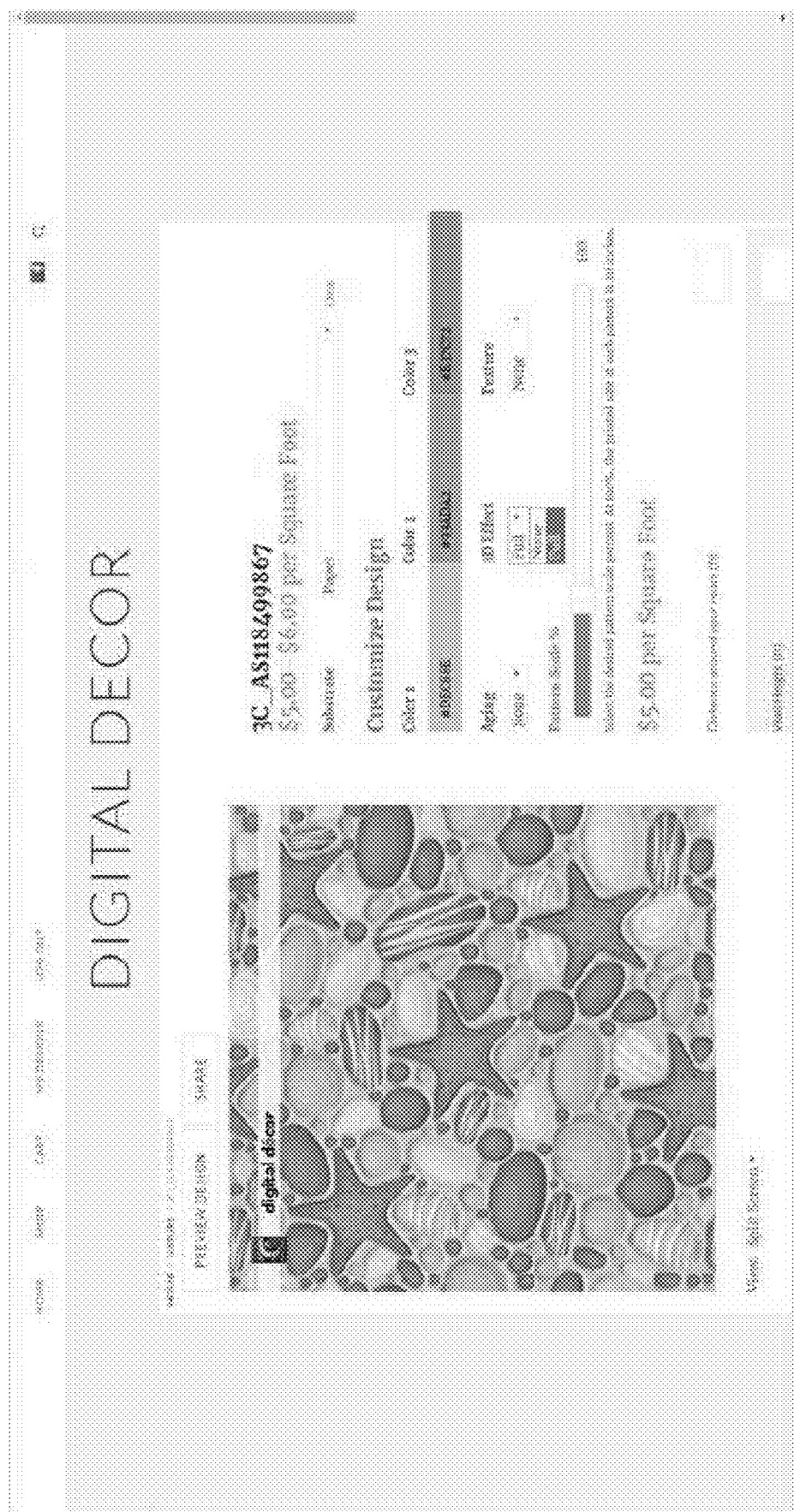

FIG. 31 shows that a user can also select to customize the paper by selecting if they would like a 3D effect. FIG. 32 shows the 3D effect set at the FULL option, but there could be a gradual or graded scale here as well. Other embodiments may include choices such as "Off", "On", "0%", "10%", "20%", "30%", "40%", "50%", "60%", "70%", "90%", "100%", "Half", etc. Other 3D options may include "Emboss", "Fabric Overlay", "Metal Overlay", or any of the other 3D effects described in this disclosure.

Figure 33:
Figure 34:
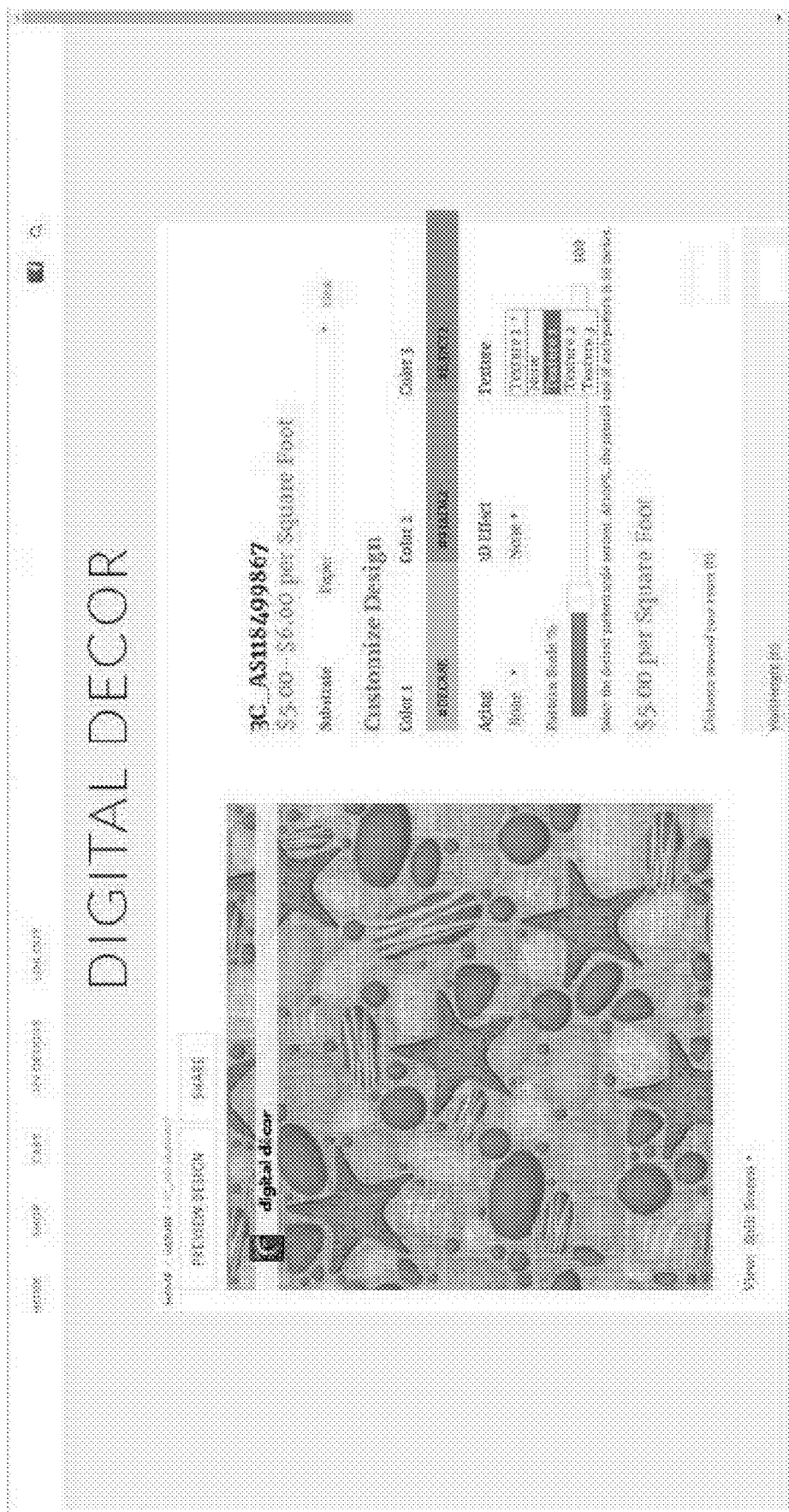
Figure 35:
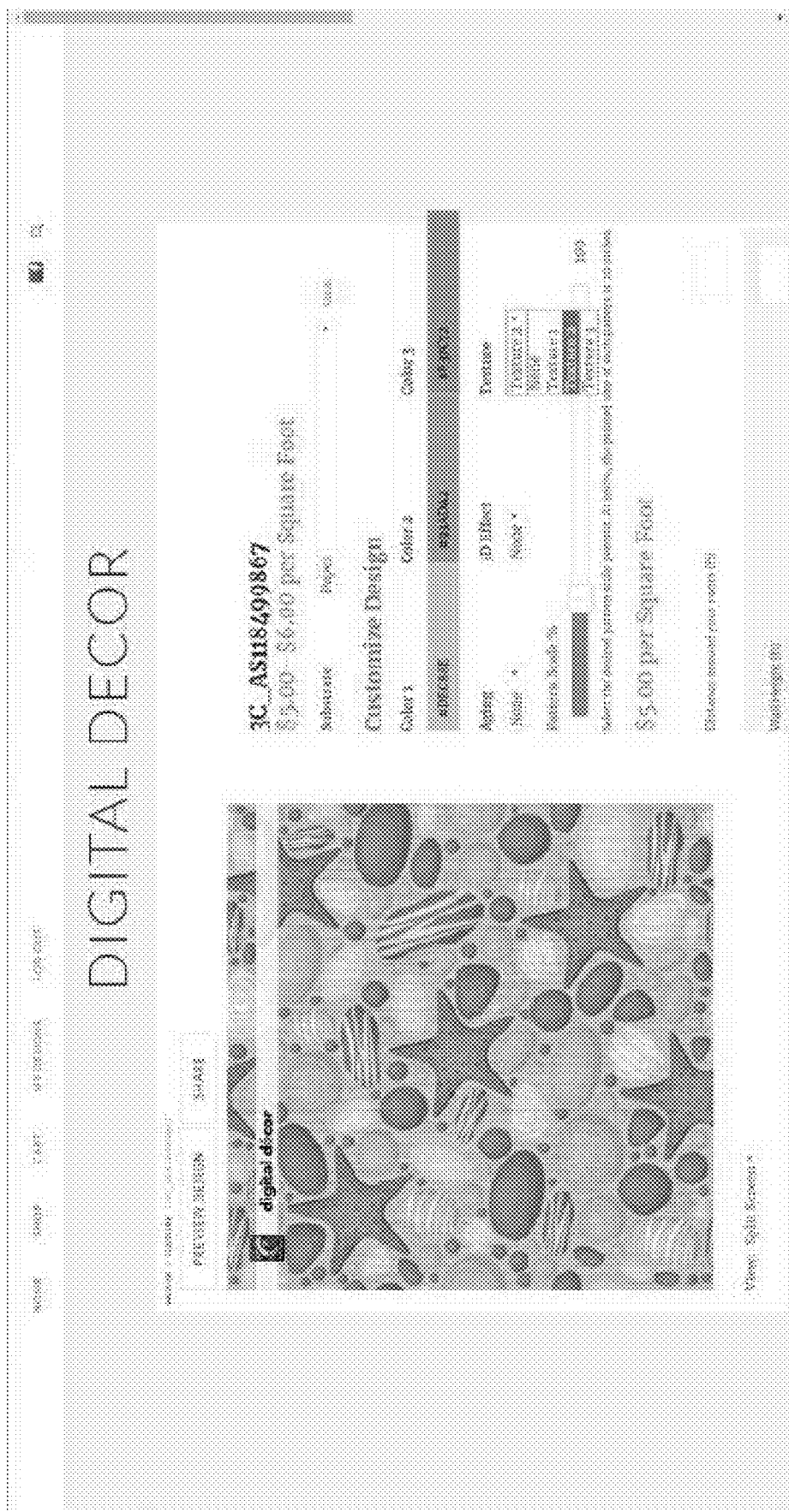
Figure 36:
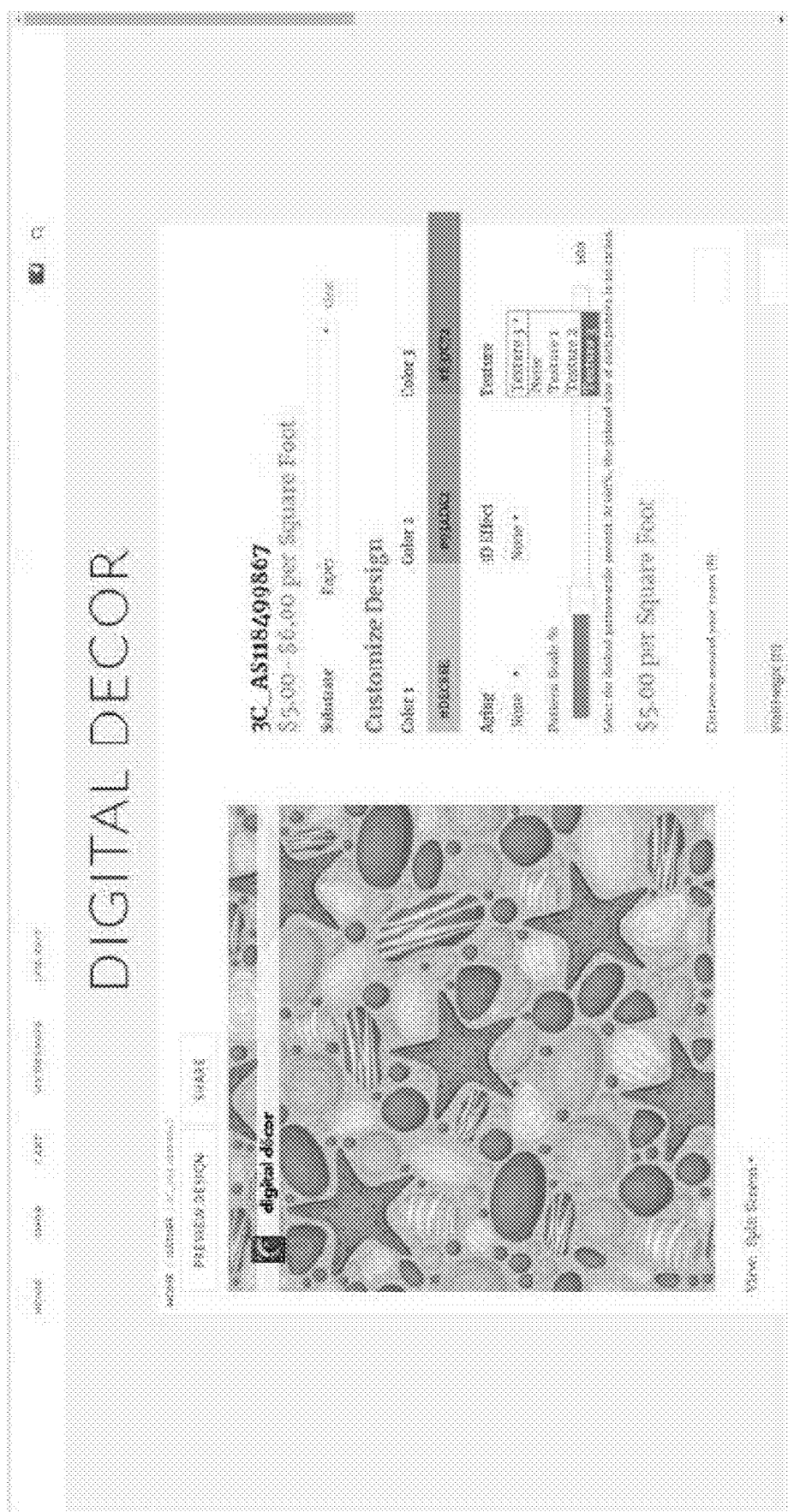

FIG. 33 shows that a user can also select whether they want to add the appearance of a texture on the paper, with FIGS. 34-36 showing the pattern as it appears with the Texture 1, Texture 2, and Texture 3 options are selected, respectively. However, other embodiments may include specific texture effects such as "Linen", "Wood Grain", "Cork", "Weave", "Cross Hatch", or any other texture effects described in this disclosure.

Figure 37:
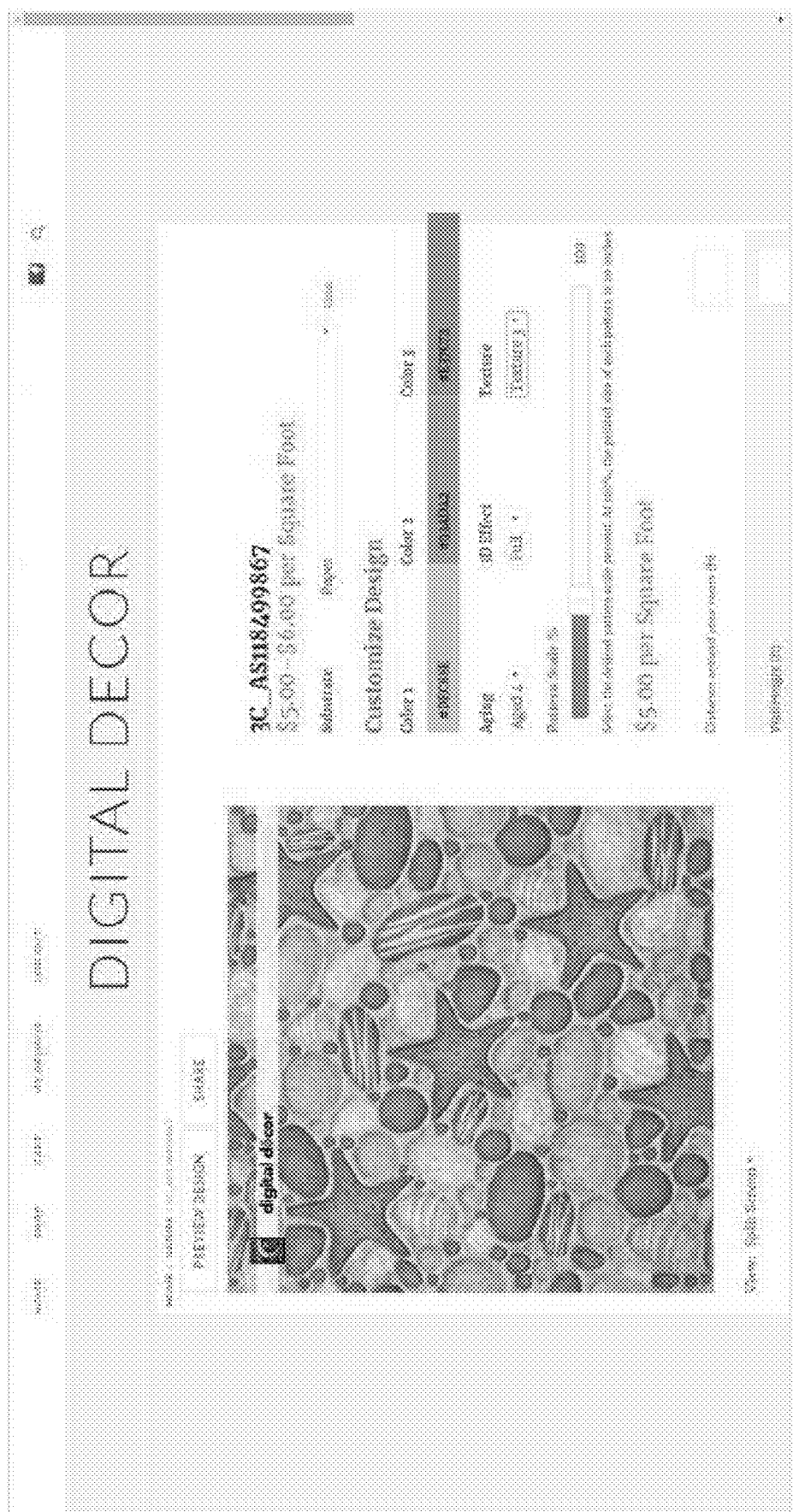

The Aging, 3D Effect, and Texture Options can be combined in any manner that the user desires. In FIG. 37, Aging 4, Full 3D Effect, and Texture 3 have been combined to create a custom design.

Figure 38:
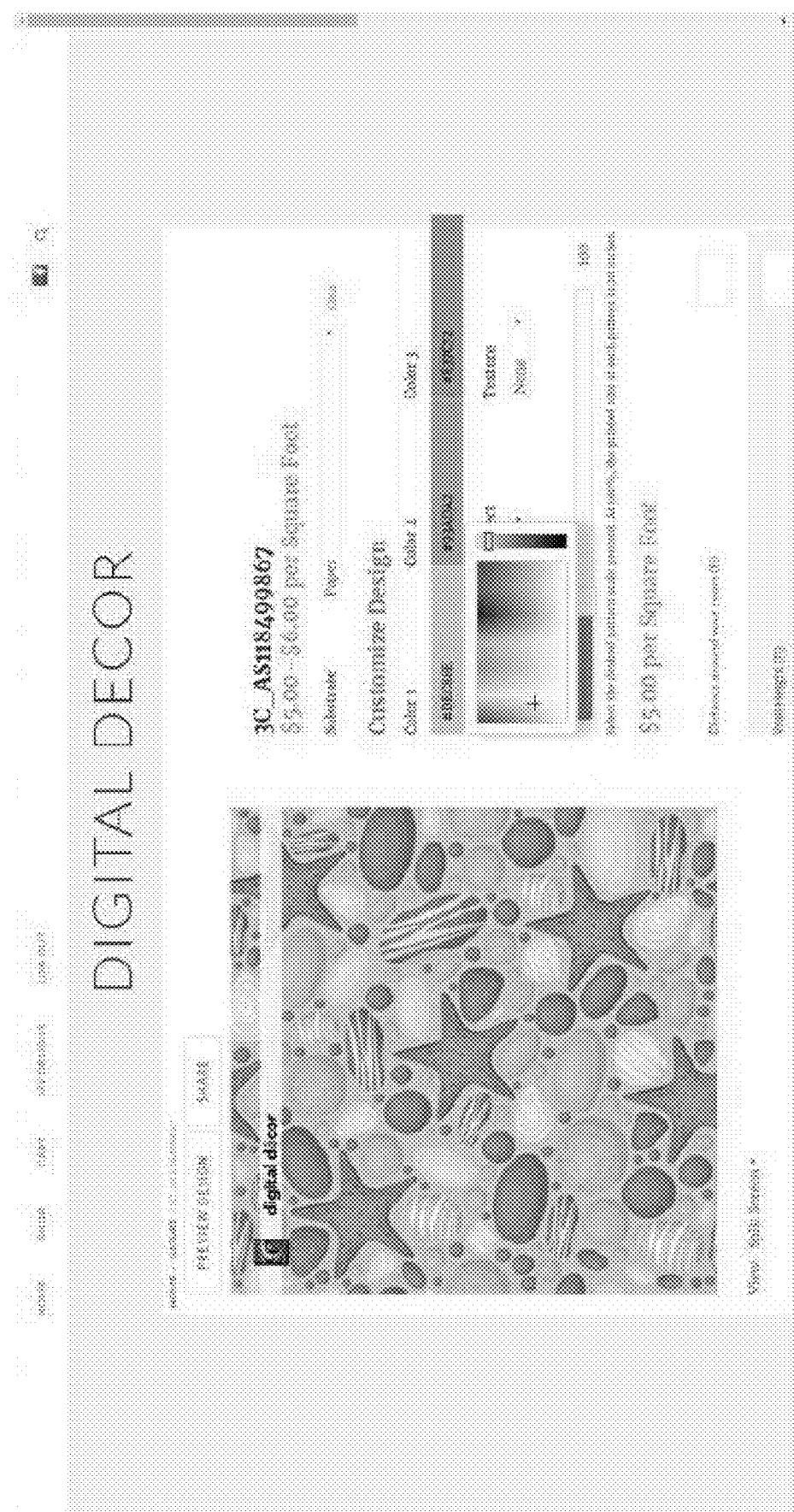
Figure 39:
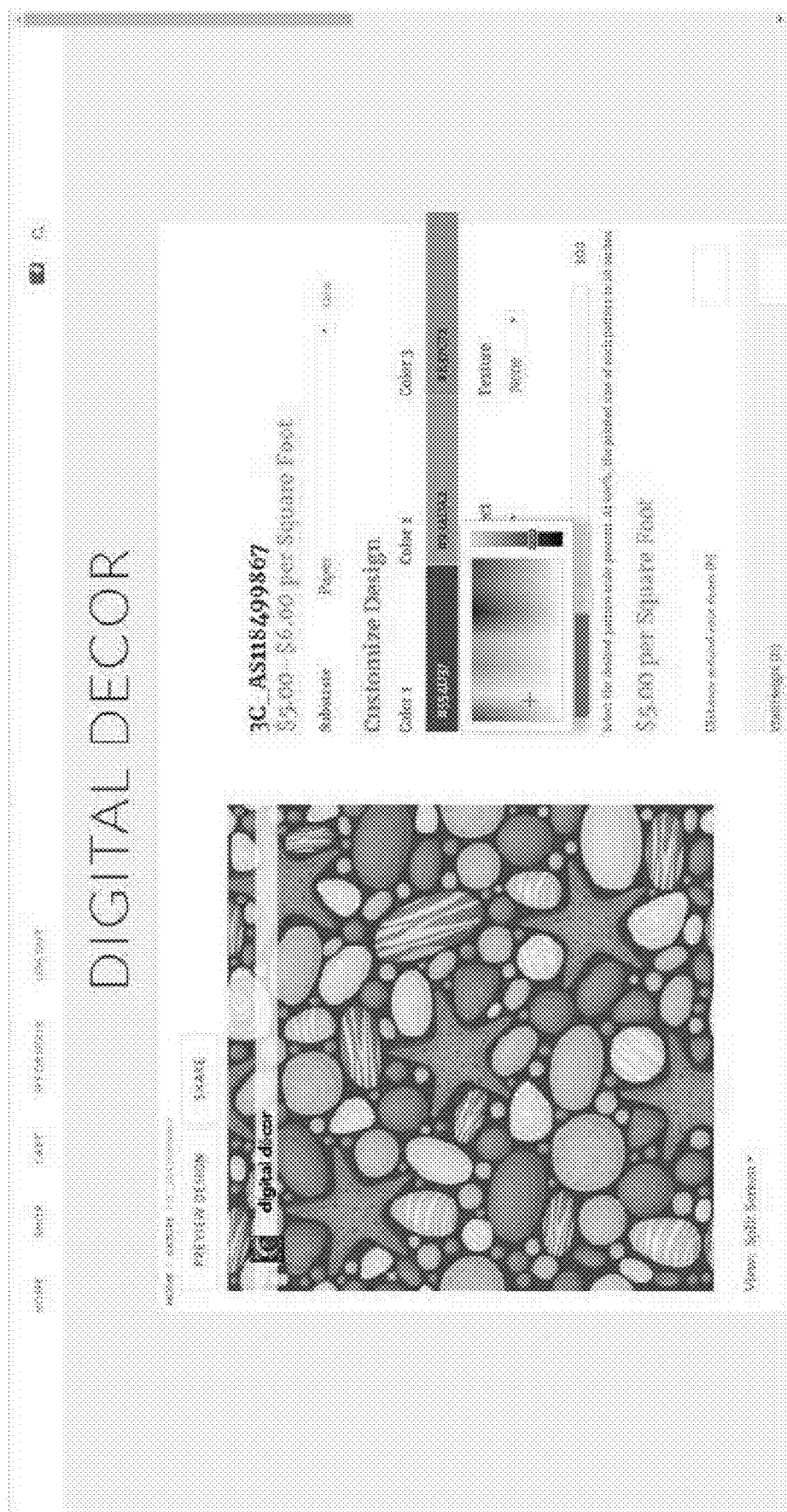

FIGS. 38 and 39 show that the user can also fully customize the different color portions of the patterns to fit any desired pallet. In this pattern, there are three major color fields Color 1, Color 2, Color 3. FIG. 38 shows that if the user selects the color, a drop down window appears that includes a shade level bar that the user can slide up and down to adjust the shade of Color 1. FIG. 39 shows the effect of moving the shade bar on the pattern. Note that only the background Color 1 is adjusted. Also note that the color code number has also changed for reference.

Figure 40:
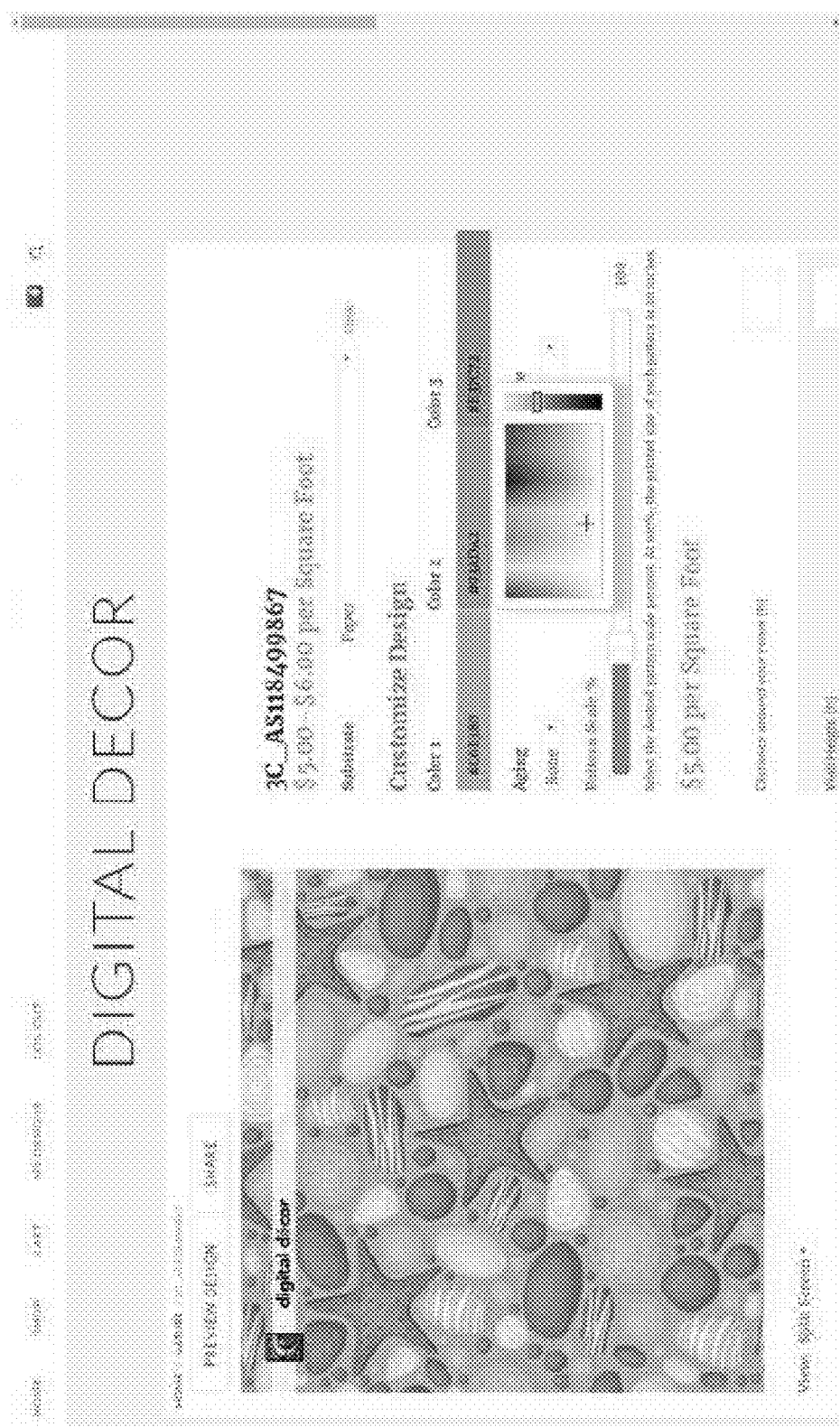
Figure 41:
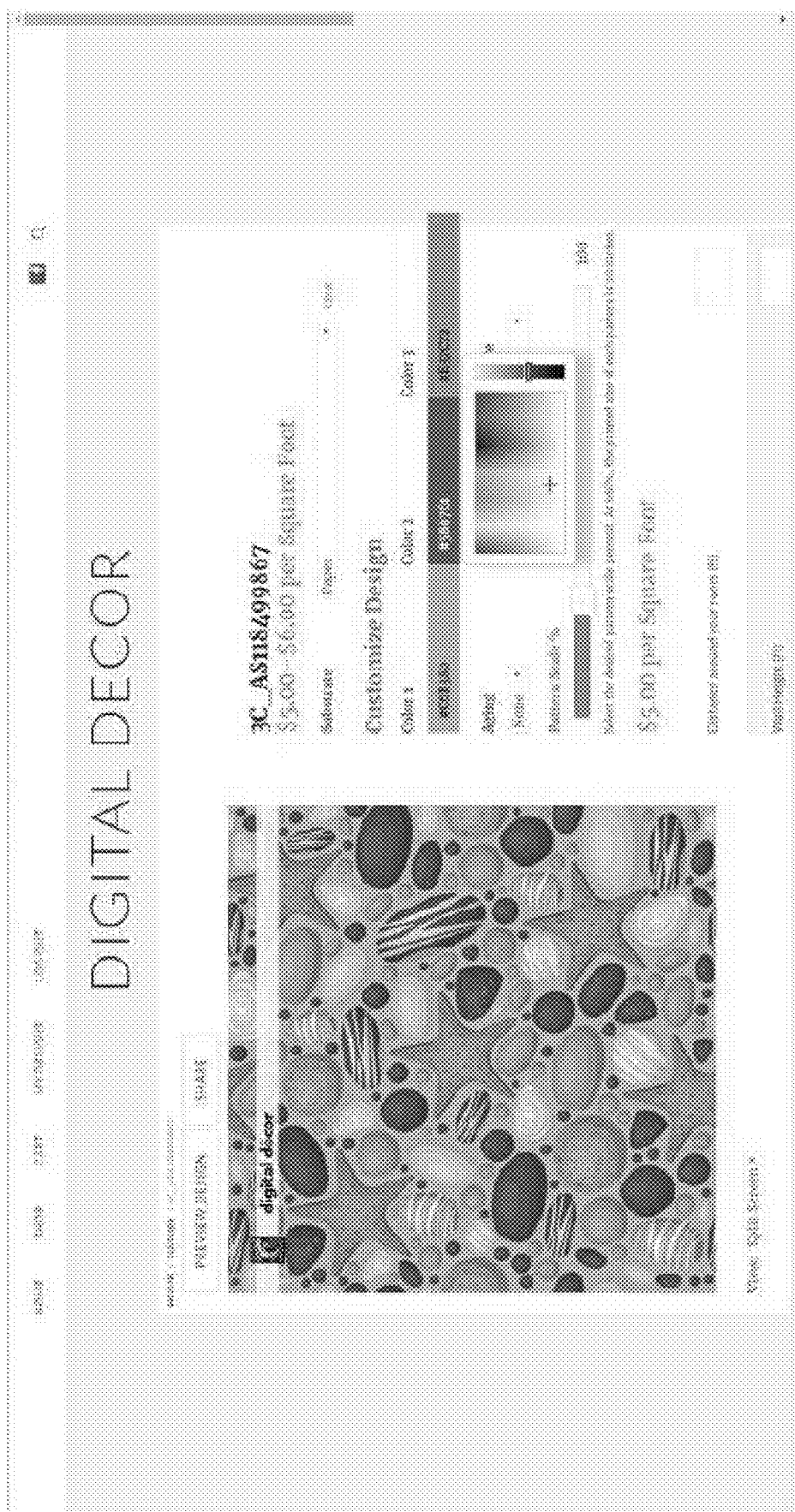

FIGS. 40 and 41 show that the user can now select the Color 2 options that make-up the pebbles in the pattern. Again, the same shade wheel is available to adjust to the desired color as shown in FIG. 40, while FIG. 41 shows the new shade of Color 2 and where only the Color 2 or the pebbles are affected.

Figure 42:
Figure 43:

FIGS. 42 and 43 show that the user can select the Color 3 Options for shade. Color 3 represents the color in the starfish. FIG. 43 is an example after the shade has been adjusted. Again, only Color 3 of the starfish is affected. It should be appreciated that some patterns may be made up of less or more colors and the features would be the same. This example shows three, but there could be any number of colors that could be adjusted.

Figure 44:
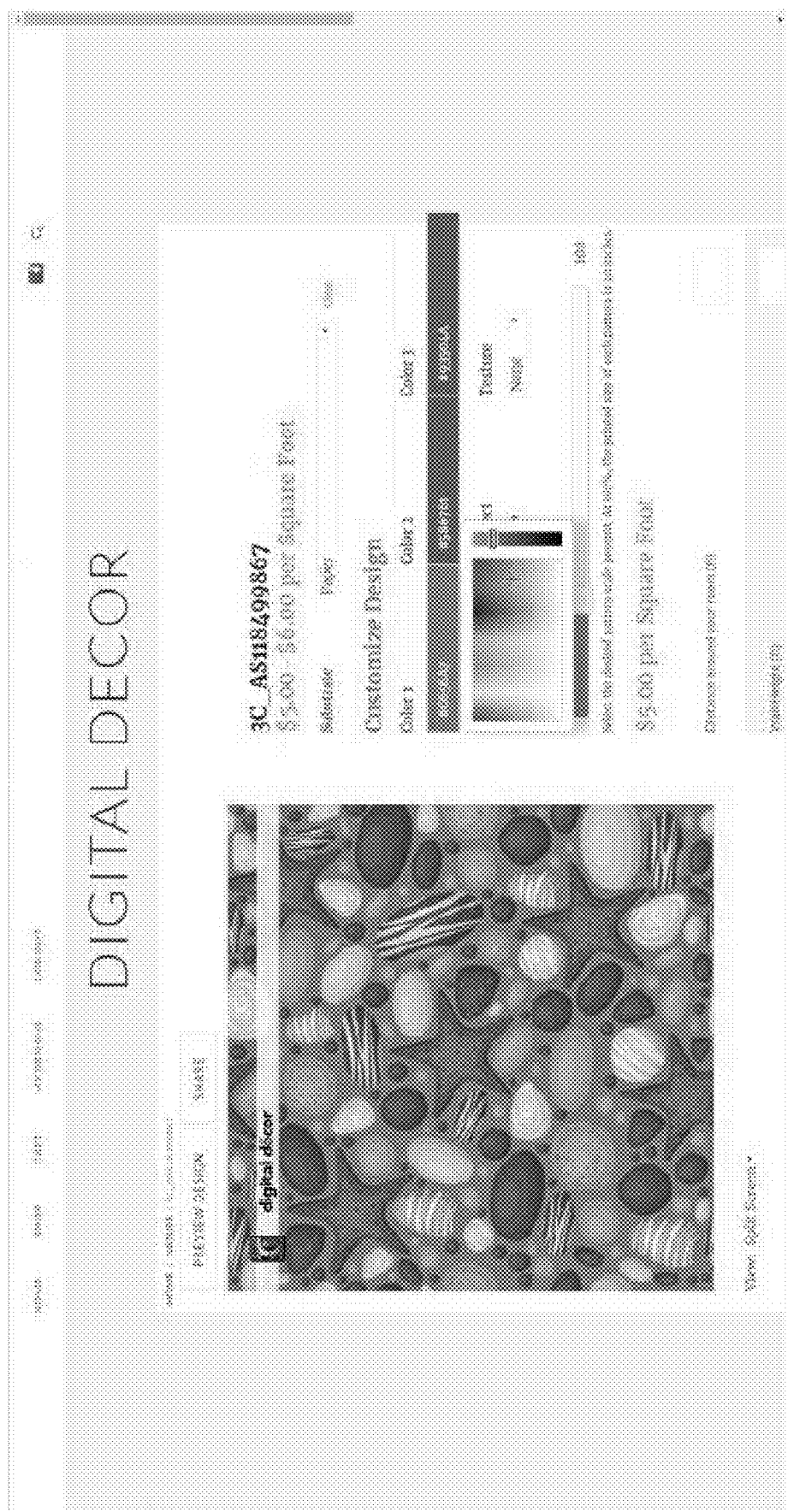
Figure 45:
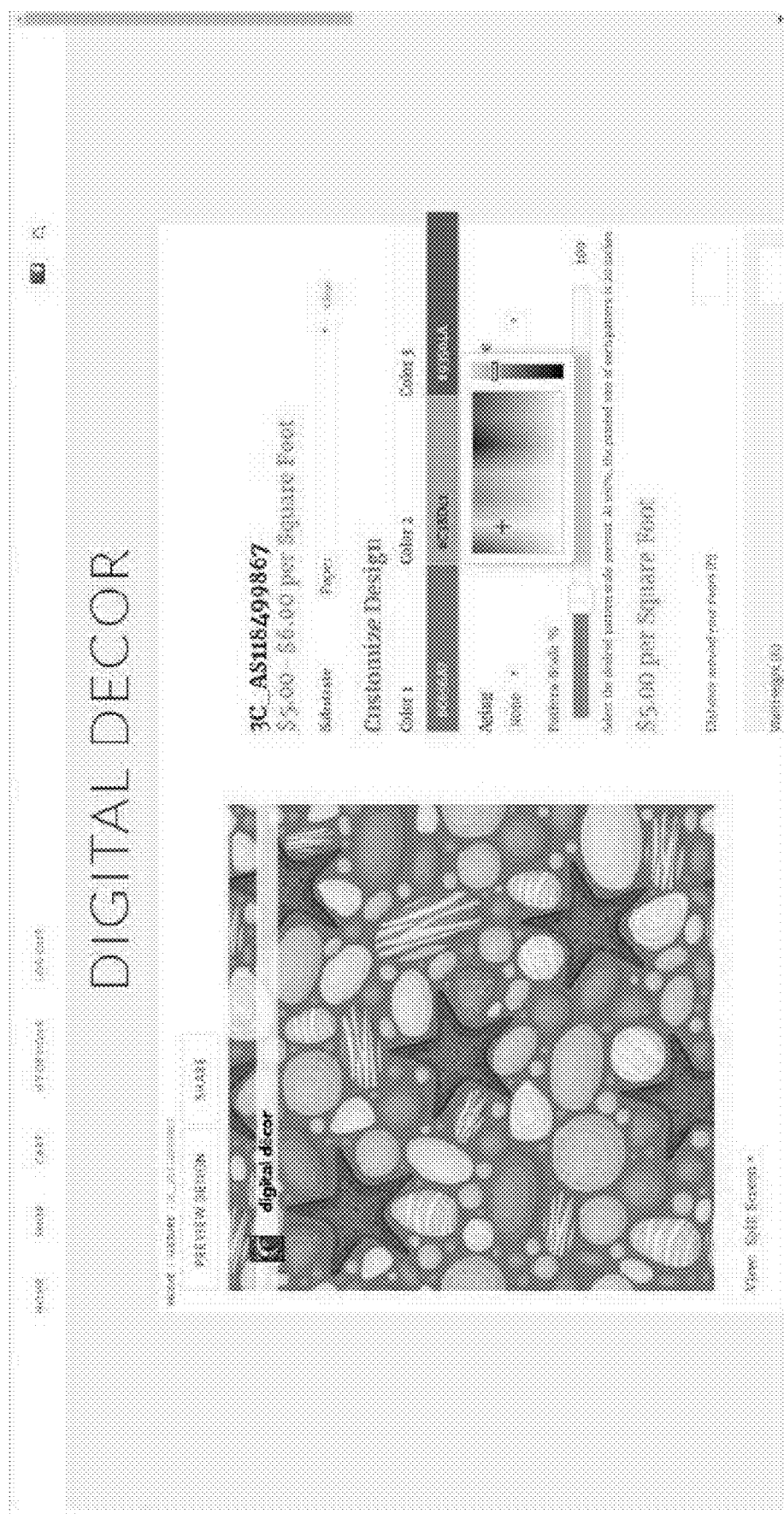

FIGS. 44 and 45 show that not only can the user select the shade of each color option, the user can also select the color he or she prefers from a near infinite amount of possibilities as shown by the color spectrum that is included in the dropdown color option window. In FIG. 44 the background color, Color 1, has been changed to pink. Notice the shade bar also changes with the selection to the selected color and is fully functional as before. FIG. 45 shows that Color 2 is changed in the exact same manner.

Figure 46:
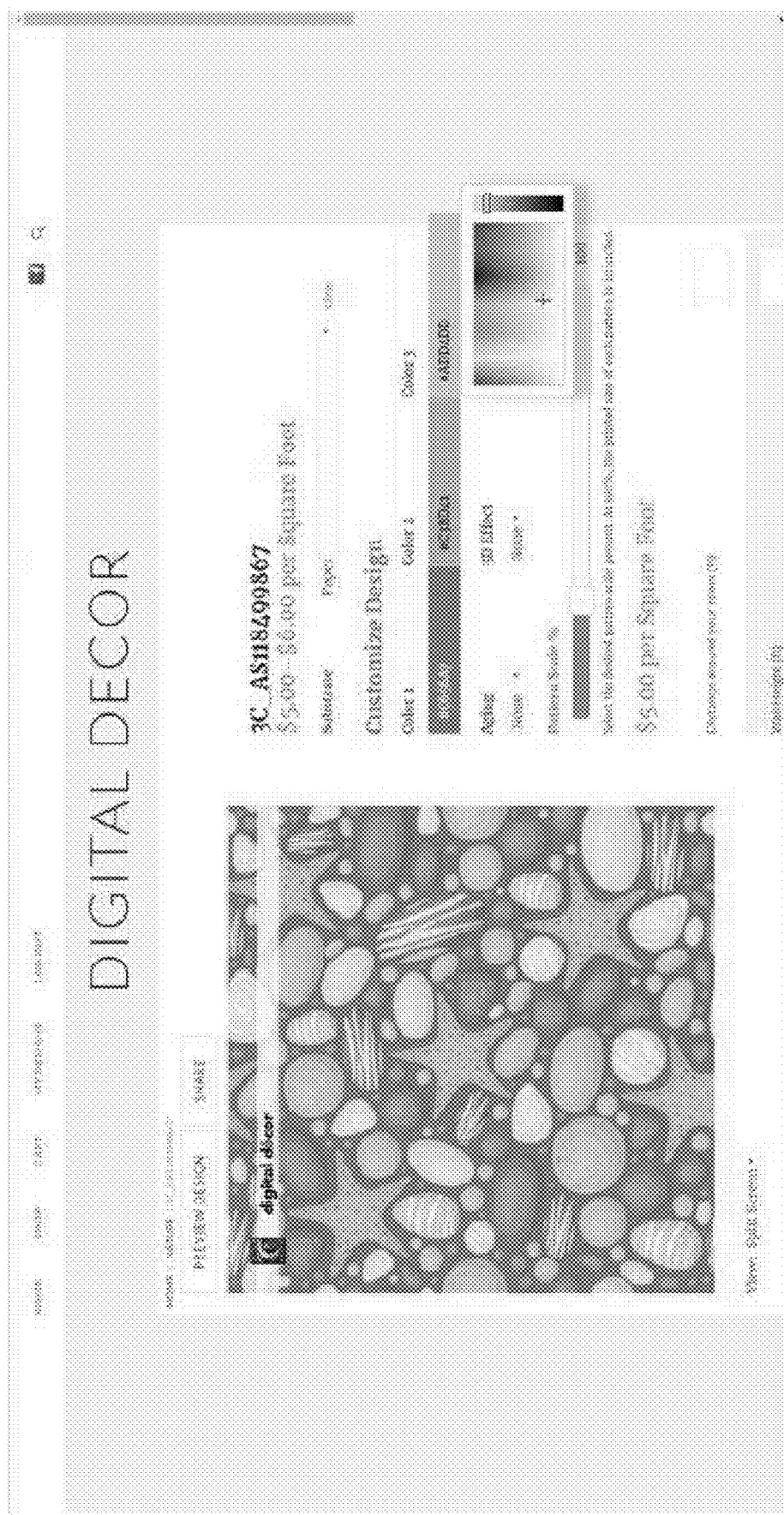
Figure 47:
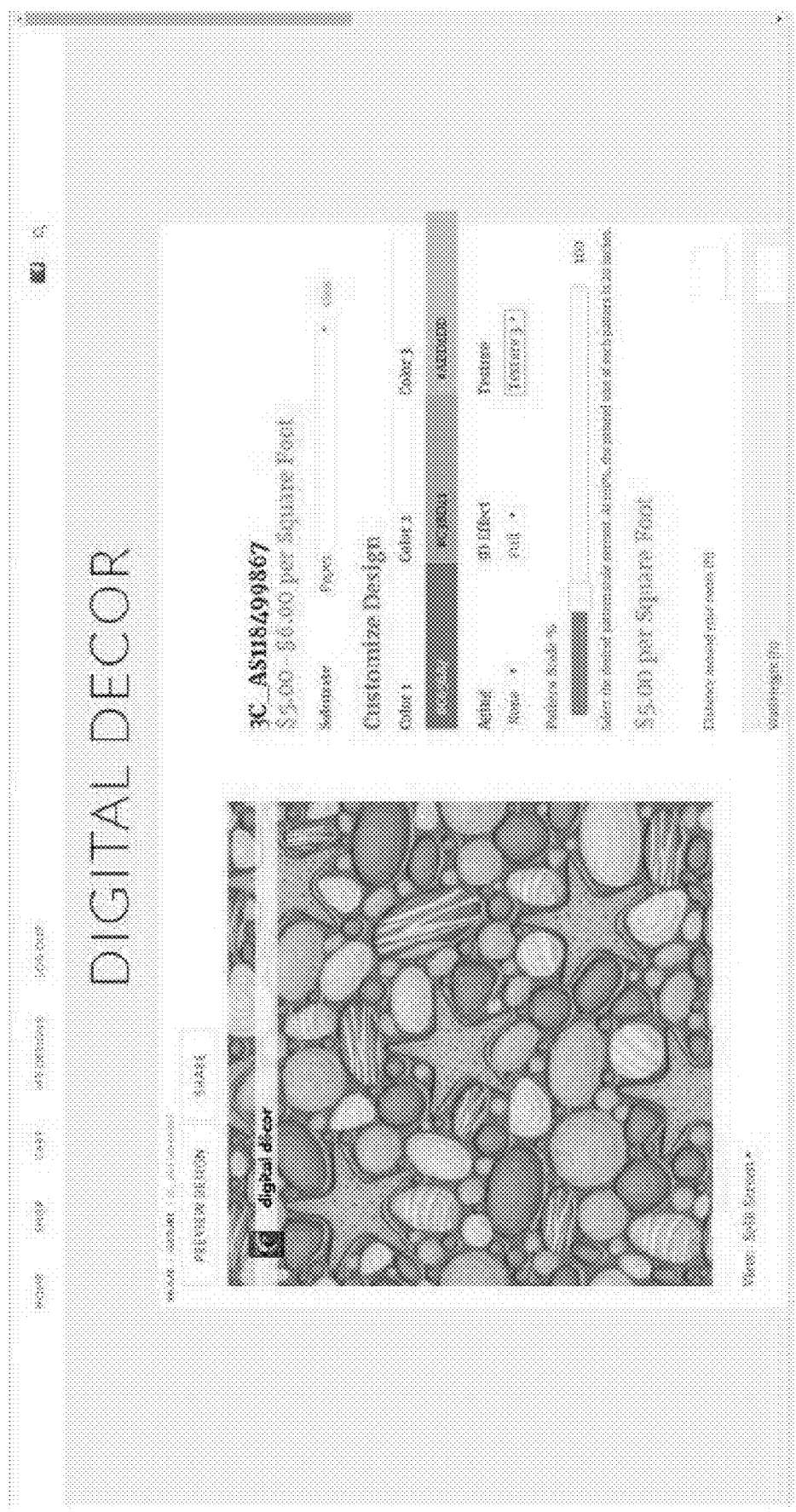

FIG. 46 shows that Color 3, the starfish color is also changed by the user. This is the color pallet that the user prefers. And now that the selected color code numbers are known, the user can then "Color Lock" the color code numbers and apply them to all the patterns in the database automatically. This saves them from having to adjust the colors for each subsequent pattern that they view. With the color scheme decided, the user can then go through the Aging, 3D Effect, and Texture options to finish off the look, as shown in FIG. 47.

Figure 48:
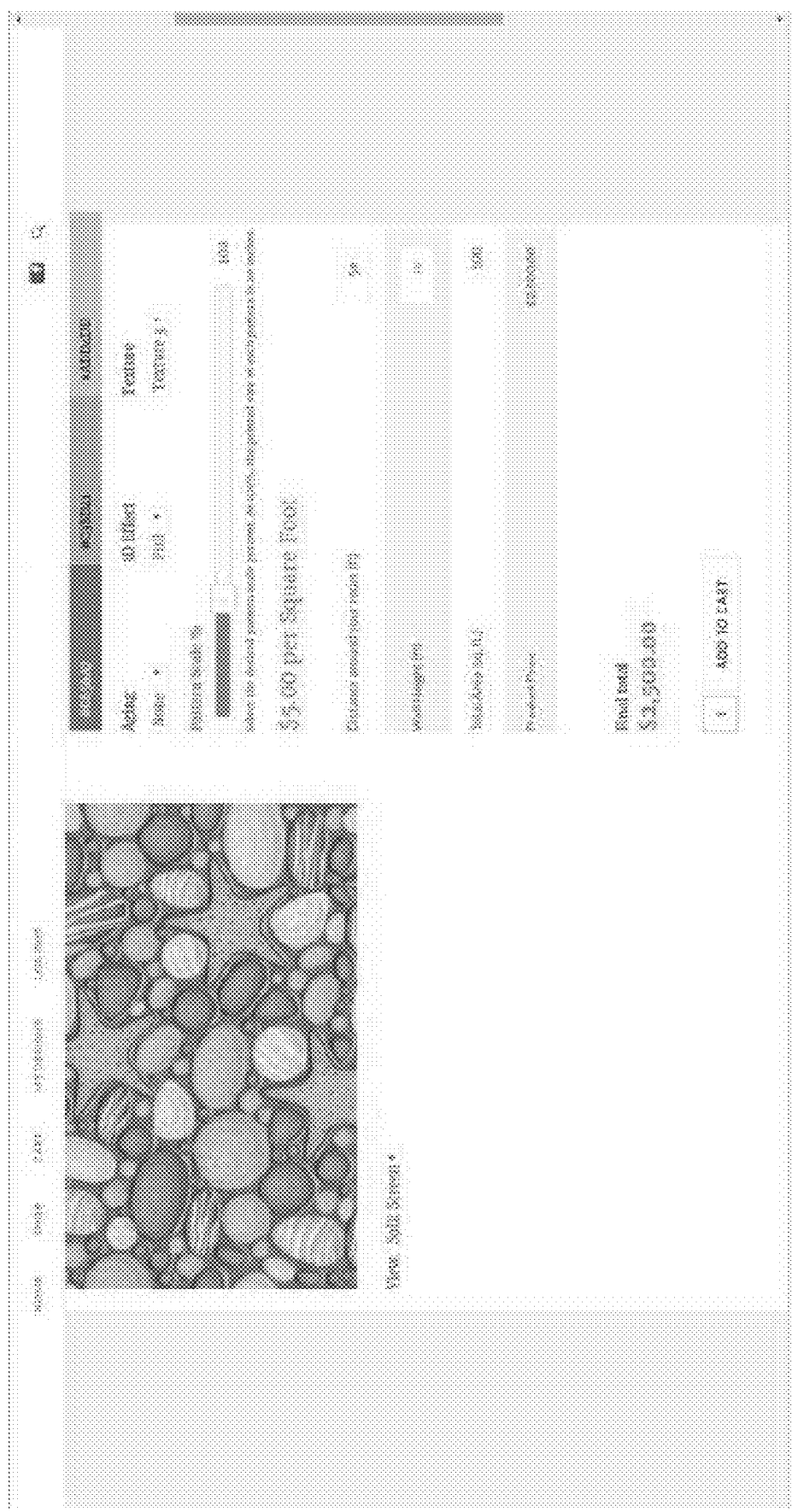
Figure 49:
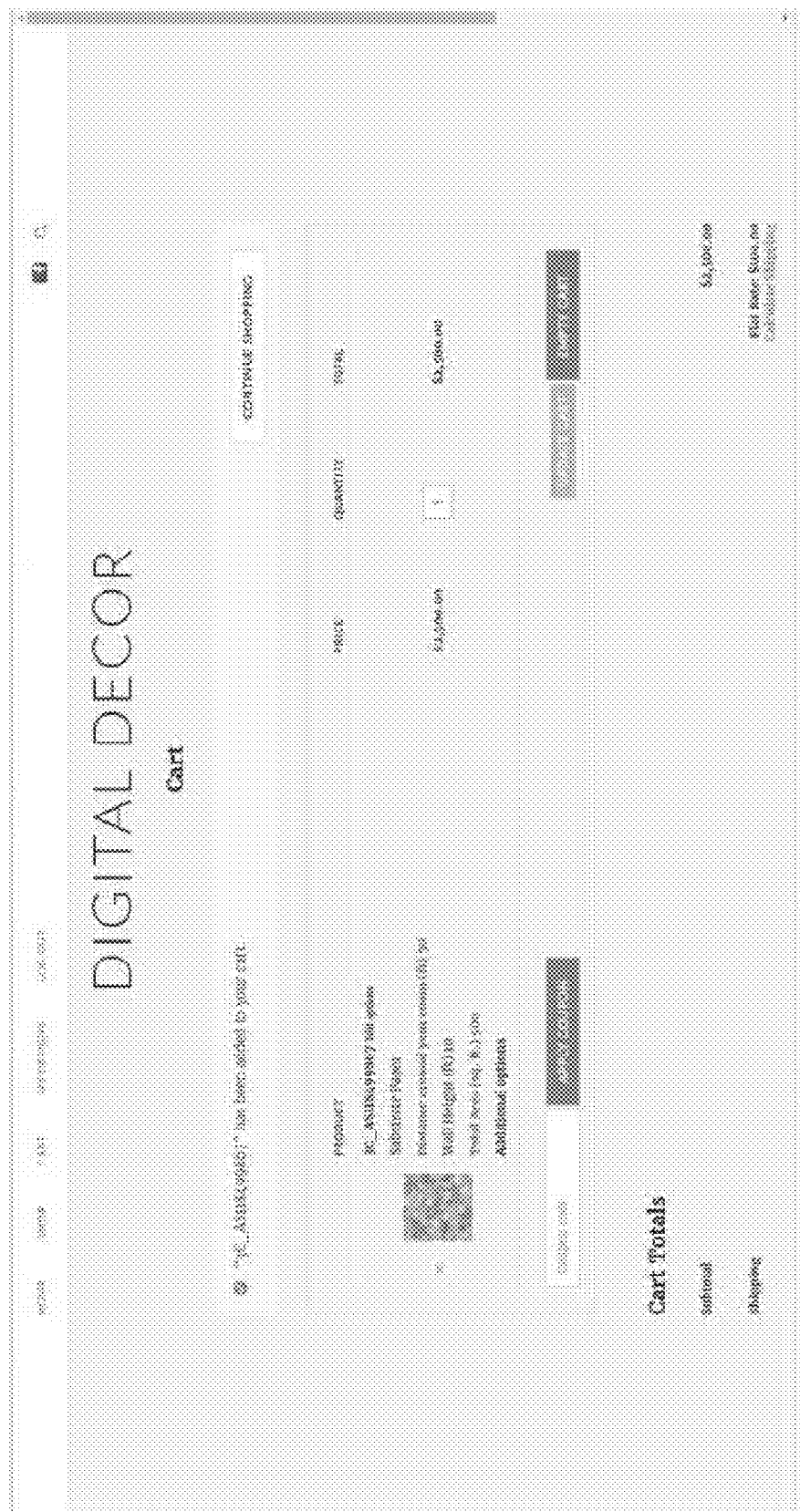
Figure 50:
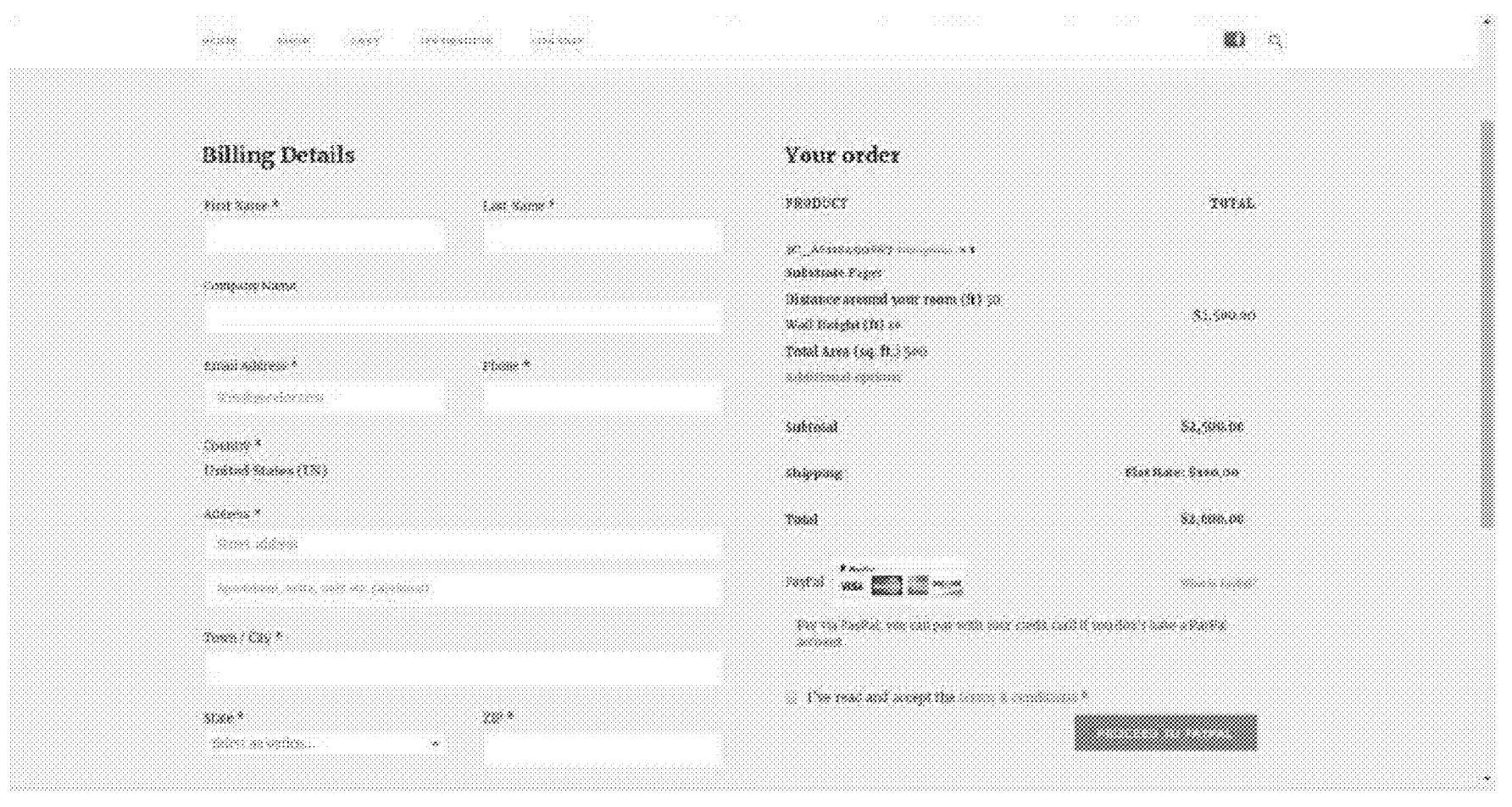

FIG. 48 shows that with the perfect pattern and color scheme selected, the user then enters the distance around the room (or alternatively, wall width can be selected) and the wall height. The total area is calculated and the final price is determined. FIG. 49 shows the user cart and cart totals and FIG. 50 shows the billing page.

Figure 51:
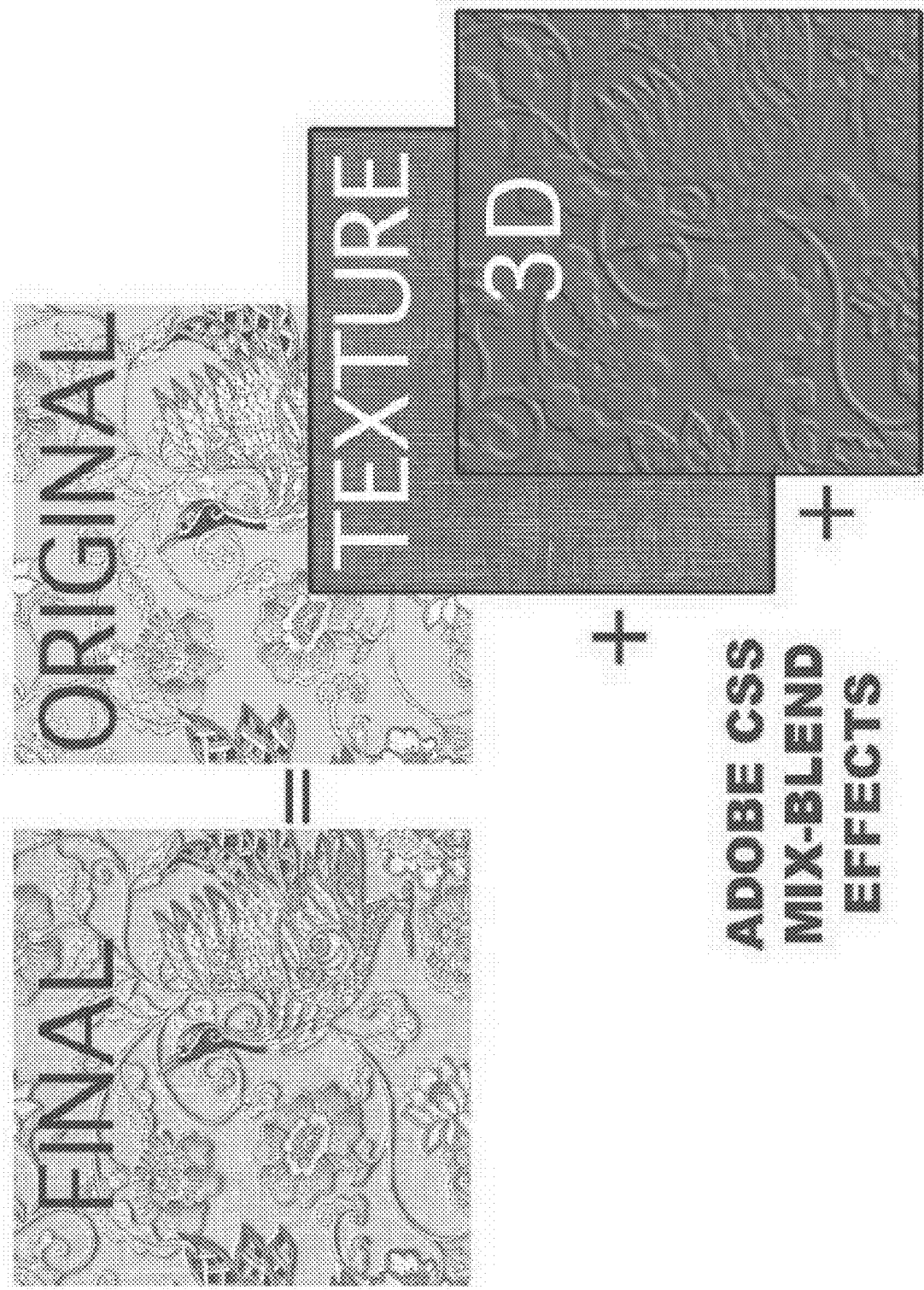

FIG. 51 shows that the final wallpaper is composed of components such as the original pattern, texture, and 3D effect through Adobe CSS mix-blend effects.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A computer-implemented method for virtual design of wallpaper, comprising:
    providing a plurality of cross-layers;
    providing one or more interactions between cross-layers and/or providing one or more environmental and/or aging variables which affect one or more of the cross-layers;
    wherein each cross-layer represents a substrate in a virtual construction, and
each cross-layer is defined by one or more cross-elements comprising:
    a color-class element, which provides a color zone such that elements of the image share a single color value;
    a color-cluster element, which provides for modification of a group of colors such as the group appears in a pattern in the image;
    a 3D element, which provides three-dimensional effects in the image; a solidity element, which defines how the cross-layer would appear if the cross-layer is backlit;
    a transparency element, which defines how much the cross-layer will colorize the cross-layer behind it;
    a reflectivity element, which defines whether the cross-layer is shiny or matte; and/or
    a metallicity element, which defines whether the cross-layer or a portion of the cross-layer is metallic; and
    one of the cross-layers represents wallpaper comprising a pattern.

2. The method of claim 1, wherein the cross-layers represent substrates comprising one or more of plywood, concrete, stucco, paint, linen, paper, cardboard, ink mask, ink, varnish, vinyl, adobe, aluminum, steel, copper, other metals, cement, brick, drywall, plaster, gypsum board, paint, wood finish, paint finish, veneer, marble, ceramic, stone, plastics, foam, fabric, glass, fiberglass, or any combination of these.

3. The method of claim 1, wherein the environmental variables comprise water, sunlight, florescent lighting, oxygen, dirt, smoke, wear and tear, or any combination of these.

4. The method of claim 1, wherein the aging variables comprise a length of time in the future comprising 1 month, 2 months, 3 months, 4 month, 5 months, 6 months, 7 months, 8 months, 9 months, 10 months, 11 months, 1 year, 1.5 years, 2 years, 2.5 years, 3 years, 3.5 years, 4 years, 4.5 years, 5 years, 10 years, 15 years, 20 years, 25 years, 30 years, 40 years, 50 years, 75 years, or 100 years.

5. The method of claim 1, wherein the appearance of the wallpaper cross-layer includes features of other cross-layers, effects of the environmental variables, or effects of the aging variables.

6. The method of claim 1, wherein each cross-layer is defined by an image stored as one or more vector or raster image files.

7. The method of claim 1, wherein the interactions between cross-layers and the one or more environmental or aging variables are capable of adjustment according to a quantitative scale.

8. The method of claim 1, wherein the interactions between cross-layers and the one or more environmental or aging variables are capable of providing a secondary pattern overlaying the wallpaper pattern, which secondary pattern reflects texture, aging, or damage.

9. The method of claim 1, wherein interactions between cross-layers are programmed to occur through one or more of the cross-elements.

10. A computer-implemented method for virtual design, comprising:
    providing a plurality of virtual substrates, each virtual substrate represented by an image and having one or more elements which define the appearance of the image, wherein the one or more elements comprise:
    a color-class element, which provides a color zone such that all elements of the image share a single color value;
    a color-cluster element, which provides for modification of a group of colors such as the group appears in a pattern in the image;
    a 3D element, which provides three-dimensional effects in the image; a solidity element, which defines how the cross-layer would appear if the cross-layer is backlit;
    a transparency element, which defines how much the cross-layer will colorize the cross-layer behind it;
    a reflectivity element, which defines whether the cross-layer is shiny or matte;
    and/or
    a metallicity element, which defines whether the cross-layer or a portion of the cross-layer is metallic;
    providing one or more interactive effects between elements of two or more of the virtual substrates; and
    providing one or more environmental and/or aging variables capable of influencing the appearance of the image.

11. The method of claim 10, wherein one of the virtual substrates represents wallpaper and the appearance of the wallpaper substrate includes features of other virtual substrates, effects of the environmental variables, or effects of the aging variables.

12. The method of claim 11, wherein the image of the wallpaper substrate represents a pattern.

13. The method of claim 10, wherein the virtual substrates represent plywood, concrete, stucco, paint, linen, paper, cardboard, ink mask, ink, varnish, vinyl, adobe, aluminum, steel, copper, other metals, cement, brick, drywall, plaster, gypsum board, paint, wood finish, paint finish, veneer, marble, ceramic, stone, plastics, foam, fabric, glass, or fiberglass, or any combination of these.

14. The method of claim 10, wherein the image representing each virtual substrate is stored in a vector file having a format comprising AI, EPS, SVG, or PDF.

15. The method of claim 10, wherein the image representing each virtual substrate is stored as a raster file having a format comprising JPEG/JPG, PNG, GIF, BMP, or TIFF.

* * * * *